(12) United States Patent
Mendelson

(10) Patent No.: US 10,470,013 B1
(45) Date of Patent: Nov. 5, 2019

(54) SYSTEM AND METHOD FOR AUTOMATICALLY GENERATING AND UPDATING WAYPOINT INFORMATION IN REAL TIME

(71) Applicant: Ehud Mendelson, Coral Springs, FL (US)

(72) Inventor: Ehud Mendelson, Coral Springs, FL (US)

( * ) Notice: Subject to any disclaimer, the term of this patent is extended or adjusted under 35 U.S.C. 154(b) by 0 days.

(21) Appl. No.: 15/953,389

(22) Filed: Apr. 13, 2018

Related U.S. Application Data

(62) Division of application No. 15/687,445, filed on Aug. 26, 2017, now Pat. No. 9,961,507, which is a division of application No. 15/403,146, filed on Jan. 10, 2017, now Pat. No. 9,772,193, which is a division of application No. 15/397,685, filed on Jan. 3, 2017, now Pat. No. 9,674,684, which is a division of application No. 15/237,727, filed on Aug. 16, 2016, now Pat. No. 9,538,332, which is a division of application No. 15/086,028, filed on Mar. 30, 2016, now Pat. No. 9,420,423, which is a division of application No. 14/285,406, filed on May 22, 2014, now Pat. No. 9,602,193, which is a division of application No. 14/285,332, filed on May 22, 2014, now Pat. No. 9,491,584, which is a division of application No. 14/285,273, filed on May 22, 2014,
(Continued)

(51) Int. Cl.
*H04B 5/00* (2006.01)
*H04W 4/44* (2018.01)
*H04W 4/40* (2018.01)
*H04W 4/02* (2018.01)
*G01S 5/02* (2010.01)

(52) U.S. Cl.
CPC ............ *H04W 4/44* (2018.02); *G01S 5/0231* (2013.01); *H04W 4/023* (2013.01); *H04W 4/40* (2018.02)

(58) Field of Classification Search
CPC .......... H04W 4/44; H04W 4/40; H04W 4/023
USPC ........................................... 455/41.2
See application file for complete search history.

(56) References Cited

U.S. PATENT DOCUMENTS 3,114,128 A 12/1963 Ljungman
3,130,298 A 4/1964 Schwarz
(Continued)

FOREIGN PATENT DOCUMENTS

JP 9126804 A 5/1997

*Primary Examiner* — April G Gonzales
(74) *Attorney, Agent, or Firm* — Allen D Hertz, P.A.; Allen D. Hertz

(57) ABSTRACT

A method and system to automatically change an operation of a vehicle, wherein the change is based upon obtained information associated with a road sign. The system provides accurate information associated with road signs, identified as way points, in real time to a user's navigation system, to a user's cellular telephone and/or to a vehicle computer. The waypoint and associated information would be obtained according to a location of the respective receiving device. The information can be presented on a display of the user's cellular telephone, the GPS navigation system, any other Bluetooth-enabled device, etc. The system can interface with an existing GPS navigation system, a vehicle computer, etc. The process can be adapted to parking, navigation, roadway assistance, emergency conditions, mass transits, and the like.

23 Claims, 9 Drawing Sheets

Related U.S. Application Data now Pat. No. 9,204,257, which is a division of application No. 14/285,209, filed on May 22, 2014, now Pat. No. 9,204,251, which is a division of application No. 12/930,735, filed on Jan. 14, 2011, now Pat. No. 9,020,687, which is a division of application No. 11/396,843, filed on Apr. 3, 2006, now Pat. No. 7,899,583, which is a division of application No. 13/135,421, filed on Jul. 5, 2011, now Pat. No. 9,374,673, which is a division of application No. 12/932,811, filed on Mar. 7, 2011, now Pat. No. 8,941,485, which is a division of application No. 12/069,899, filed on Feb. 13, 2008, now Pat. No. 7,924,149, which is a division of application No. 11/472,706, filed on Jun. 22, 2006, now Pat. No. 8,896,485, which is a division of application No. 11/429,864, filed on May 8, 2006, now Pat. No. 8,836,580, which is a division of application No. 12/587,042, filed on Oct. 1, 2009, now Pat. No. 8,866,876, which is a division of application No. 11/429,864, filed on May 8, 2006, now Pat. No. 8,836,580.

(60) Provisional application No. 60/670,097, filed on Apr. 12, 2005, provisional application No. 60/678,947, filed on May 9, 2005.

(56) References Cited

U.S. PATENT DOCUMENTS

| | | | |
|---|---|---|---|
| 3,158,836 A | 11/1964 | McCauley | |
| 3,166,732 A | 1/1965 | Ljungman | |
| 3,867,615 A | 2/1975 | Sioufi | |
| 4,491,970 A | 1/1985 | LaWhite et al. | |
| 5,195,126 A | 3/1993 | Carrier et al. | |
| 5,250,955 A | 10/1993 | Major | |
| 5,272,483 A | 12/1993 | Kato | |
| 5,293,163 A | 3/1994 | Kakihara | |
| 5,305,370 A | 4/1994 | Kearns et al. | |
| 5,319,363 A | 6/1994 | Welch et al. | |
| 5,383,127 A | 1/1995 | Shibata | |
| 5,416,712 A | 5/1995 | Geier | |
| 5,432,508 A | 7/1995 | Jackson | |
| 5,442,348 A | 8/1995 | Mushell | |
| 5,454,461 A | 10/1995 | Jacobs | |
| 5,485,520 A | 1/1996 | Chaum et al. | |
| 5,504,482 A | 4/1996 | Schreder | |
| 5,568,535 A | 10/1996 | Sheffer et al. | |
| 5,606,506 A | 2/1997 | Kyrtsos | |
| 5,638,279 A | 6/1997 | Kishi et al. | |
| 5,652,570 A | 7/1997 | Lepkofker | |
| 5,712,619 A | 1/1998 | Simkin et al. | |
| 5,742,233 A | 4/1998 | Hoffman et al. | |
| 5,771,001 A | 6/1998 | Cobb | |
| 5,798,733 A | 8/1998 | Ethridge | |
| 5,838,237 A | 11/1998 | Revell et al. | |
| 5,873,040 A | 2/1999 | Dunn et al. | |
| 5,910,782 A * | 6/1999 | Schmitt | G08G 1/14 |
| | | | 340/539.1 |
| 5,929,777 A | 7/1999 | Reynolds | |
| 5,940,481 A | 8/1999 | Zeitman | |
| 5,971,921 A | 10/1999 | Timbel | |
| 5,995,040 A * | 11/1999 | Issler | G01S 19/02 |
| | | | 342/352 |
| 6,028,537 A | 2/2000 | Suman et al. | |
| 6,072,396 A | 6/2000 | Gaukel | |
| 6,340,928 B1 | 1/2002 | McCurdy | |
| 6,445,937 B1 | 9/2002 | daSilva | |
| 6,535,127 B1 | 3/2003 | Taylor | |
| 6,636,732 B1 | 10/2003 | Boling et al. | |
| 6,738,628 B1 | 5/2004 | McCall et al. | |
| 6,807,564 B1 | 10/2004 | Zellner et al. | |
| 6,970,101 B1 * | 11/2005 | Squire | G08G 1/14 |
| | | | 340/309.16 |
| 7,026,954 B2 * | 4/2006 | Slemmer | G08G 1/14 |
| | | | 340/932.2 |
| 7,031,875 B2 | 4/2006 | Ellenby et al. | |
| 7,034,678 B2 | 4/2006 | Burkley et al. | |
| 7,072,666 B1 | 7/2006 | Kullman | |
| 7,124,027 B1 * | 10/2006 | Ernst, Jr. | B60W 30/09 |
| | | | 701/301 |
| 7,245,216 B2 | 7/2007 | Burkley et al. | |
| 7,483,917 B2 | 1/2009 | Sullivan et al. | |
| 7,743,337 B1 | 6/2010 | Maeda et al. | |
| 7,907,931 B2 | 3/2011 | Hartigan et al. | |
| 7,933,395 B1 | 4/2011 | Bailly et al. | |
| 8,041,330 B1 | 10/2011 | Garin | |
| 8,126,960 B2 | 2/2012 | Obradovich et al. | |
| 8,705,527 B1 * | 4/2014 | Addepalli | H04W 4/046 |
| | | | 370/389 |
| 8,770,477 B2 | 7/2014 | Hefetz | |
| 8,896,485 B2 | 11/2014 | Mendelson | |
| 9,204,251 B1 | 12/2015 | Mendelson | |
| 9,538,332 B1 | 1/2017 | Mendelson | |
| 9,553,626 B2 | 1/2017 | Callaway, Jr. | |
| 2001/0026223 A1 | 10/2001 | Menard et al. | |
| 2002/0075941 A1 * | 6/2002 | Souissi | H04B 1/715 |
| | | | 375/133 |
| 2002/0129138 A1 | 9/2002 | Carter | |
| 2002/0131386 A1 * | 9/2002 | Gwon | H04W 36/0011 |
| | | | 370/338 |
| 2003/0018708 A1 * | 1/2003 | Hlasny | H04L 29/12113 |
| | | | 709/203 |
| 2003/0034881 A1 | 2/2003 | Linnett et al. | |
| 2003/0045280 A1 * | 3/2003 | Simons | H04L 12/189 |
| | | | 455/422.1 |
| 2003/0050039 A1 | 3/2003 | Baba et al. | |
| 2003/0067392 A1 | 4/2003 | Monroe | |
| 2003/0087628 A1 | 5/2003 | Michibata | |
| 2003/0148771 A1 | 8/2003 | de Verteuil | |
| 2004/0066917 A1 | 4/2004 | Yasukawa et al. | |
| 2004/0068433 A1 | 4/2004 | Chatterjee | |
| 2004/0072583 A1 | 4/2004 | Weng | |
| 2004/0239498 A1 | 12/2004 | Miller | |
| 2005/0021369 A1 | 1/2005 | Cohen et al. | |
| 2005/0070315 A1 | 3/2005 | Rai et al. | |
| 2005/0096070 A1 | 5/2005 | Kanevsky et al. | |
| 2005/0111630 A1 | 5/2005 | Potorny et al. | |
| 2005/0187819 A1 | 8/2005 | Johnson | |
| 2005/0221858 A1 | 10/2005 | Hoddie | |
| 2005/0232469 A1 * | 10/2005 | Schofield | G06K 9/00818 |
| | | | 382/104 |
| 2006/0003775 A1 | 1/2006 | Bull | |
| 2006/0033641 A1 * | 2/2006 | Jaupitre | G08G 1/14 |
| | | | 340/932.2 |
| 2006/0095331 A1 | 5/2006 | O'Malley et al. | |
| 2006/0122767 A1 | 6/2006 | Athalye | |
| 2006/0163349 A1 | 7/2006 | Neugebauer | |
| 2006/0224294 A1 * | 10/2006 | Kawazoe | B60W 30/143 |
| | | | 701/93 |
| 2006/0225936 A1 * | 10/2006 | Kawazoe | B60T 7/16 |
| | | | 180/167 |
| 2006/0229792 A1 * | 10/2006 | Kawazoe | B60W 30/16 |
| | | | 701/93 |
| 2006/0253226 A1 | 11/2006 | Mendelson | |
| 2006/0271265 A1 * | 11/2006 | Kawazoe | B60W 30/146 |
| | | | 701/93 |
| 2007/0032225 A1 | 2/2007 | Konicek et al. | |
| 2008/0227473 A1 | 9/2008 | Haney | |
| 2008/0280624 A1 * | 11/2008 | Wrappe | G01S 1/68 |
| | | | 455/456.1 |
| 2009/0006418 A1 | 1/2009 | O'Malley | |
| 2010/0120447 A1 | 5/2010 | Anderson | |
| 2010/0142402 A1 * | 6/2010 | Boldyrev | H04L 43/0817 |
| | | | 370/254 |
| 2012/0023171 A1 * | 1/2012 | Redmond | H04M 1/7253 |
| | | | 709/205 |

(56) References Cited

U.S. PATENT DOCUMENTS

2012/0084364 A1* 4/2012 Sivavakeesar ...... H04L 12/1818
                                                    709/205
2012/0188101 A1   7/2012 Ganot
2013/0113936 A1   5/2013 Cohen

* cited by examiner

SYSTEM AND METHOD FOR AUTOMATICALLY GENERATING AND UPDATING WAYPOINT INFORMATION IN REAL TIME

RELATED APPLICATIONS

This application is:

A) is a Divisional Application of copending U.S. patent application Ser. No. 15/687,445 filed on Aug. 26, 2017 (scheduled to issue as U.S. Pat. No. 9,674,684 on May 1, 2018),
  wherein U.S. patent application Ser. No. 15/687,445 is a Divisional Application of copending U.S. patent application Ser. No. 15/403,146 filed on Jan. 10, 2017 (now U.S. Pat. No. 9,772,193 on Sep. 26, 2017),
  wherein U.S. patent application Ser. No. 15/403,146 is a Divisional Application of copending U.S. patent application Ser. No. 15/397,685 filed on Jan. 3, 2017 (now U.S. Pat. No. 9,674,684 on Jun. 6, 2017),
  wherein U.S. patent application Ser. No. 15/397,685 is a Divisional Application of copending U.S. patent application Ser. No. 15/237,727 filed on Aug. 16, 2016 (now U.S. Pat. No. 9,538,332 on Jan. 3, 2017),
  wherein U.S. patent application Ser. No. 15/237,727 is a Divisional Application of copending U.S. patent application Ser. No. 15/086,028 filed on Mar. 30, 2016 (now U.S. Pat. No. 9,420,423 on Aug. 16, 2016),
  wherein U.S. patent application Ser. No. 15/086,028 is a Divisional Application of copending U.S. patent application Ser. No. 14/285,406 filed on May 22, 2014 (now U.S. Pat. No. 9,602,193 on Mar. 21, 2017),
  wherein U.S. patent application Ser. No. 14/285,406 is a Divisional Application of copending U.S. patent application Ser. No. 14/285,332 filed on May 22, 2014 (now U.S. Pat. No. 9,491,584 on Nov. 8, 2016),
  wherein U.S. patent application Ser. No. 14/285,332 is a Divisional Application of copending U.S. patent application Ser. No. 14/285,273 filed on May 22, 2014, (now U.S. Pat. No. 9,204,257 on Dec. 1, 2015),
  wherein U.S. patent application Ser. No. 14/285,273 is a Divisional Application of copending U.S. patent application Ser. No. 14/285,209 filed on May 22, 2014, (now U.S. Pat. No. 9,204,251 on Dec. 1, 2015),
  wherein U.S. patent application Ser. No. 14/285,209 is a Divisional Application of copending U.S. patent application Ser. No. 12/930,735 filed on Jan. 14, 2011 (now U.S. Pat. No. 9,020,687 on Apr. 28, 2015),
  wherein U.S. patent application Ser. No. 12/930,735 is a Divisional Application of copending U.S. patent application Ser. No. 11/396,843 filed on Apr. 3, 2006 (now U.S. Pat. No. 7,899,583 on Mar. 1, 2011),
  wherein U.S. patent application Ser. No. 11/396,843 is a Non-Provisional U.S. Patent Application claiming the benefit of U.S. Provisional Patent Application Ser. No. 60/670,097 filed on Apr. 12, 2005;

B) wherein U.S. patent application Ser. No. 14/285,209 is a Divisional Application of copending U.S. patent application Ser. No. 13/135,421 filed on Jul. 5, 2011 (now U.S. Pat. No. 9,374,673 on Jun. 21, 2016),
  wherein U.S. patent application Ser. No. 13/135,421 is a Divisional Application of copending U.S. patent application Ser. No. 12/932,811 filed on Mar. 7, 2011 (now U.S. Pat. No. 8,941,485 on Jan. 27, 2015),
  wherein U.S. patent application Ser. No. 12/932,811 is a Divisional Application of copending U.S. patent application Ser. No. 12/069,899 filed on Feb. 13, 2008 (issued as U.S. Pat. No. 7,924,149 on Apr. 12, 2011),
  wherein U.S. patent application Ser. No. 12/069,899 is a Divisional Application of copending U.S. patent application Ser. No. 11/472,706 filed on Jun. 22, 2006 (now U.S. Pat. No. 8,896,485 on Nov. 25, 2014),
  wherein U.S. patent application Ser. No. 11/472,706 is a Divisional Application of copending U.S. patent application Ser. No. 11/429,864 filed on May 8, 2006 (now U.S. Pat. No. 8,836,580 on Sep. 16, 2014),
  wherein U.S. patent application Ser. No. 11/429,864 is a Non-Provisional U.S. Patent Application claiming the benefit of U.S. Provisional Patent Application Ser. No. 60/678,947 filed on May 9, 2005, and C) wherein U.S. patent application Ser. No. 14/285,209 is a Divisional Application of copending U.S. patent application Ser. No. 12/587,042 filed on Oct. 1, 2009 (now U.S. Pat. No. 8,866,876 on Oct. 21, 2014),
  wherein U.S. patent application Ser. No. 12/587,042 is a Divisional Application of copending U.S. patent application Ser. No. 11/429,864 filed on May 8, 2006 (now U.S. Pat. No. 8,836,580 on Sep. 16, 2014),
  wherein U.S. patent application Ser. No. 11/429,864 is a Non-Provisional U.S. Patent Application claiming the benefit of U.S. Provisional Patent Application Ser. No. 60/678,947 filed on May 9, 2005.

SPECIFICATION AND DRAWINGS

This application replicates and presents claims that rely upon the Specification and drawings of U.S. patent application Ser. No. 11/472,706 filed on Jun. 22, 2006 (now U.S. Pat. No. 8,896,485 on Nov. 25, 2014).

FIELD OF THE INVENTION

This invention is directed generally to the field of navigation and, more particularly, to a method to be used for navigation indoors or outdoors for automatically generating and updating real time waypoints along the route.

BACKGROUND OF THE INVENTION

Introduction to Location Based Services:

Location based services (LBS) are rapidly expanding. Outdoor location technologies are mainly based on Global Positioning System (GPS) technologies. GPS is not capable of performing properly indoors, and is therefore inadequate. As a result, indoor location systems are appearing on the market.

The need for a system arises from various market segments and applications. One example in the market is the GPS based systems that use integrated positioning and navigation systems based on GPS receivers as the primary positioning technology. Subsequent to the events of September 11th, the Federal government mandated that GPS capability be included in all cellular phones.

However, the fact that uninterrupted satellite reception is not possible in many locations is a major limitation of GPS based systems. Densely populated areas and radio-frequency-signal shadowed locations, such as urban centers (a.k.a. "urban canyons"), generally do not allow proper operation of GPS, yet it is in these locations that the need is greatest.

There is a clear need for a cost effective system that maintains performance indoors, in urban canyons and in city centers.

Description of GPS System.

The Global Positioning System (GPS) is a satellite-based navigation and time transfer system developed by the U.S. Department of Defense. GPS serves marine, airborne and terrestrial users, military and civilian users. Specifically, GPS includes the Standard Positioning Service (SPS) that provides civilian users with 100 meter accuracy as to the location or position of the user. For military users GPS provides the Precise Positioning Service that is accurate to within 20 meters. Both of these services are available worldwide with no requirement for any local equipment.

View of GPS Limitations:

A first limitation of GPS is that upon activation the GPS receiver scans for signals from the GPS satellites. A unit must locate and receive signals from at least four satellites to be able to determine its location. This process of locating the satellites, receiving the data and achieving a position fix can take several minutes. This delay is problematic for many GPS applications.

A second limitation of GPS is that the receiver needs a clear view of the sky to successfully receive signals from the satellites, again under unfriendly RF conditions such as inside buildings, or in "urban canyons" or in the shadows of high buildings, the GPS suffers from multi-path effects and therefore shows poor performance, or none at all.

A third Limitation is limited accuracy: There is a problem of limited accuracy of the civilian GPS signal. While knowing your position to within 50 to 200 feet anywhere on the planet is a major technological feat, it is still not accurate enough, to locate and navigate to an a store in a mall or to empty parking space, where each space measures about 10 feet, and most indoor stores/malls are located where the GPS cannot work effectively.

Existing navigation systems, such as the new mandatory GPS equipped cellular phones, are based on GPS and have the aforementioned limitations.

Another significant factor adding to the limitations of the GPS based systems is the important role of map production; normally a user, requires a map to be as detailed and as up-to-date as possible. The existing maps used by the GPS based systems provide limited detail and are not able to reflect changes on a real time basis; more importantly there is no mapping for indoor facilities at all. The recent introduction of imagery services, such as GOOGLE EARTH® and its competitors that are offered as an enhancement to GPS at a fee still provide out of date information, with the unsatisfactory result that users encounter road changes and area development not shown on the maps and imagery.

The most common problem with today's GPS based systems is that the mapping and the waypoints are not updated on a timely basis. In most areas, the maps provided are not updated and sometimes provide misleading information. Some of the waypoints listed appear to be about 2 years old. The new service like GOOGLE EARTH® provides satellite images that are almost 2 years old and for sure can't provide on-line real-time accurate picture of the existing area and the waypoints.

The present invention focuses on finding a solution to this task by providing a system and method to generate automatically the waypoint along the user route either indoor, or outdoor. The present invention focuses on the task of interactively guiding the user to a desired indoor and outdoor destination.

The disclosed system and method automatically updates waypoints, by means of an interface to an existing GPS based system, when each point of interest will have an RF tag/sensor that will broadcast an RF signal that will be converted to a GPS waypoint, or they will update the RF broadcaster (e.g. satellite radio or FM radio stations). In response to the RF signal (from the tags/sensors, or the FM broadcasters) the GPS based navigation system will execute the specified file/program that will initiate a process to automatically execute a waypoint generation program.

For some years, local governments in cooperation with various FM radio stations have been putting together an automated way to get real-time traffic data into cars so drivers can avoid traffic. Real time traffic information includes news such as: congestion, construction, traffic accident, recommended alternative routes.

A tag/sensor will be installed at each point of interest. The tag/sensor will broadcast RF or will send information as PAD (Program Associated Data) to a FM broadcaster (satellite radio or FM station) signals that provide relevant, up-to-date and in real time waypoint information that will be received automatically by existing GPS based systems.

The user will no longer need to enter his waypoints manually and then wait for the providers of maps or GPS to update their maps with the information (this can take about a year in some cases). This way the user will receive the information that he needs when he needs it and where he needs it.

Again, the process could be exclusive of Internet or cellular communications, the communication is directly between the tags/sensor, or directly from the FM broadcaster and the user's GPS. In the event that more information is required it may be necessary to connect to the Internet.

It is believed that sooner or later it will be a standard procedure to install a tag/sensor on every location of interest (waypoint) or any business will provide waypoint information to the FM or satellite broadcaster to provide users with the information. Most stores or POI/waypoints will be willing to pay for a tag/sensor or pay subscription fee to be on the GPS system on the area that will show their location and information on a map. Or they will pay for an annual listing (similar to the yellow pages).

No software is needed; the System will interface with existing GPS. No more late updates from GOOGLE®, YAHOO®, and the like. Presently GPS providers, map providers and search engines provide: CITYNAVIGATOR® and METROGUIDE® Maps that contain many thousands of attractions.

These include: Food and Lodging, Attractions, Entertainment, Shopping, Services, Transportation, Emergency and Government offices. In most areas, the maps provided are not updated and sometimes provide misleading information. Some of the waypoints listed appear to be about 2 years old. Listed Attractions include theme parks, museums, libraries, schools, parks and such. This feature is very useful in an unfamiliar area. Waypoints will be located automatically in the local area and plotted on the map screen. The waypoints can be stored on the GPS database for future access.

The disclosed innovation will revolutionize the GPS based systems and the mapping industry, from GPS, mapping companies' communication providers, car manufacturers to yellow pages and local guides; for the first time the user of a GPS navigation system will have an easy reliable way to reach a destination.

The most common problem with today's GPS based systems is that the mapping and the waypoints are not updated on a timely basis. The disclosed innovation is the solution for this problem. Using the disclosed innovation the user will know where they are, be able to identify landmarks around him accurately, and receive automatic updates directly from the points of interest in the vicinity.

The disclosed innovation is based on RF tag or information to be sent to RF/FM or satellite radio broadcaster for each waypoint or point of interest, each tag or waypoints has its own ID (identifying the waypoint by type, address, etc.). The sensors/tags will broadcast, via RF, to interface with existing navigation; GPS based systems, as a floating information display on the GPS map referenced to the user's location. The floating display will provide automatic waypoint updates and will allow the user to search local providers (waypoints/store), even without any connections, no communication, Internet or cellular is needed, the communication is directly between the tags/sensor or the FM broadcaster and the user GPS.

Once an individual is in the vicinity of their destination and they switch on your navigation device, they will automatically receive the facility information along their waking route and in all directions around them.

No further action is required, there is no need to send a request or to access the Internet/web or log on and search a database or central system.

Other systems must have bandwidth available, over which to send a request to a central system, or to a database, and then must wait for a response. This takes time!

The disclosed unique approach does not need an Internet bandwidth or cellular communication.

As a result, there is no delay or waiting for communication and access time, the communication is instantaneous, directly between the tags and the user's navigation device.

Additionally, each facility type can color-coded to identify the type of the store etc., e.g. restaurants, men's wear, women's wear etc.

Each color-coded display of facility can be accessed to obtain complete information about the store e.g., automatic waypoint information.

Due to the limitation of the mapping system currently use by the GPS navigation system, the disclosed display method is a unique way to bridge existing devices like cellular phones, in-car navigation and other Bluetooth devices. The disclosed method provides an overlay navigation method display method over the existing navigation system, as a real-time floating display, or as a waypoint to overcome the limitations of GPS based systems and the existing mapping systems where each waypoint will be display in a color code in the circular floating display over existing mapping or even without any mapping at all. The display will allow the user to easy find the location of the waypoint around them.

The display method is a unique way to bridge existing devices like cellular phones, in-car navigation and other Bluetooth devices. The disclosed method provides an overlay add-up display method over the existing navigation system, as a real-time floating overlay omnidirectional circular display to overcome the limitations of GPS based systems and the existing mapping systems.

The overlay add-up device/display works without mapping; a VOR like add-up display shows automatically the waypoint in the immediate area without the need for a mapping background. Or the overlay can be displayed over any existing navigation system, such as a car navigation, portable device, or cellular phone with GPS.

The fact is: no digital maps are entirely accurate. A user needs to know which map makers are used by the product that they are interested in and check the maps for the area that they are concerned about. In addition some map databases are created from vector data while others are just scanned copies of paper maps. In addition to mapping data these same map makers can often provide Points of Interest (POI) data. However, a software company might use the maps from one company and the POI data from another. POI data normally takes three forms. One form is of public buildings, parks, airports, and possibly geographic objects. A second form is government locations that include specialized points lists like marker buoys and airplane markers. Finally, there are commercial establishments, which usually include some information about their product and contact data. Note that the location of commercial places is often derived from the street address and is not based on the actual latitude/longitude location. More over there is the sky rocketing cost of digitizing and updating the POI and the way points.

The task at hand is to provide a solution when the user will receive real-time point of interest or waypoints in the area where he is automatically to his existing navigation system or to his cellular phone, the waypoints information can be information that are real-time information update in real-time and can be change according to the waypoints, any of a variety of applications using the disclosed process can provide the information associated with any of the following exemplary applications:

The user may wish to locate an empty available parking space in his vicinity. Each empty parking space can be viewed as a waypoint.

The user may wish to see and locate the real estate property available in their area according to their location.

The user may wish to locate a specific store in a shopping mall, each store in a mall is a waypoints or a particular aisle in a department store, or a specific item on a shelf.

The user may wish to locate a specific conference room in a convention center, or a point of interest in an amusement park or a point of interest in a museum.

The user may wish to find the emergency exit route in time of emergency or the first response team need to navigate within a facility in an emergency situation.

The user may be looking for a train location in a train station, stops in a subway system, an underground train system, and the like; each of which (waypoints, information, etc.) would be updated in real-time.

It is believed that the disclosed automatic waypoint update will revolutionize the GPS and Navigation Industry.

For the first time, the user will know what they want, when they want, and according to their location.

The local business owner can introduce the business's content in real-time to the (navigation) users in his area.

The GPS and navigation industry can tap to the huge local advertising market (estimate at $134B in the US alone at the time of this submission).

Moreover, the presented invention is not stopping by providing only an Icon.

PRIOR ART

At present, however, no prior art device utilizes the capabilities to display a real-time representation of navigating directly from the waypoints without a central system; and without using an Internet or any bandwidth communication. Also most of systems are designed for the old query type search where interface to Internet and or database central system needed.

The disclosed system automatically detects a signal directly from the waypoints, without any requirement for a communication link, such as a cellular communication system. Other systems must have a bandwidth available, over which, the other systems send a request to a central system, or to a database, and then the system must wait for a response. In an alternative communication method, the other systems rely upon an Internet connection. This takes time.

Even if the other systems have bandwidth, the other systems are still based on the existing search concept where the user submits a query, searches, and awaits for the response. All of this is impractical. The disclosed system provides the information automatically, without submitting any query, and the response is according to the user's location.

Again, most of the existing prior arts are based either on a GPS based system or the existing car navigator, that depends on a GPS too.

And the existing mapping that these systems use has the same limitations described previously and is impractical.

It is believed that the disclosed system and associated method bridges a gap between the GPS based navigation and provides a complete solution.

Ellenby et al. (U.S. Pat. No. 7,031,875) describes a pointing system for addressing objects, provide a system and method based on GPS and Internet/database communication, it is not exactly a navigation but a information based system that need the GPS to locate the user location so indoor services is likely out of the questions and the need for communication as well with GPS limit its availability and accuracy. It is not real-time update of the waypoints and needed Internet and or central database communication.

SUMMARY OF THE INVENTION

In accordance with the present invention, these are the project's characteristics:

The most common problem with today's GPS based systems is that the mapping and the waypoints are not updated on a timely basis. In most areas, the maps provided are not updated and sometimes provide misleading information. Some of the waypoints listed appear to be about 2 years old. The new service like GOOGLE EARTH® provides satellite images that are almost 2 years old and for sure can't provide on-line real-time accurate picture of the existing area and the waypoints.

The present invention focuses on finding a solution to this task by providing a system and method to generate automatically the waypoint along the user route either indoor or outdoor.

The present invention focuses on the task of interactively guiding the user to a desired indoor and outdoor destination.

The disclosed system and method automatically updates waypoints, by means of an interface to an existing GPS based system, when each point of interest will have an RF tag/sensor that will broadcast an RF signal that will be converted to a GPS waypoint, or they will update the RF broadcaster (e.g. satellite radio or FM radio stations). In response to the RF signal (from the tags/sensors, or the FM broadcasters) the GPS based navigation system will execute the specified file/program that will trigger automatically executing a waypoint generation program.

For some years, local governments in cooperation with various FM radio stations have been putting together an automated way to get real-time traffic data into cars so drivers can avoid traffic. Real time traffic information includes news such as: congestion, construction, traffic accident, recommended alternative routes.

A tag/sensor will be installed at each point of interest. The tag/sensor will broadcast RF or will send information as PAD (Program Associated Data) to a FM broadcaster (satellite radio or FM station) signals that provide relevant, up-to-date waypoint information that will be received automatically by existing GPS based systems.

The user will no longer need to enter his waypoints manually and then wait for the providers of maps or GPS to update their maps with the information (this can take about a year in some cases). This way the user will receive the information that he needs when he needs it and where he needs it.

Again, no communication, Internet or cellular may needed, the communication is directly between the tags/sensor, or directly from the FM broadcaster and the user's GPS. In the event that more information is required it may be necessary to connect to the Internet.

It is believed that sooner or later it will be a standard procedure to install a tag/sensor on every location of interest (waypoint) or any business will provide waypoint information to the FM or satellite broadcaster to provide users with the information. Most stores or POI/waypoints will be willing to pay for a tag/sensor or pay subscription fee to be on the GPS system on the area that will show their location and information on a map. Or businesses will pay for an annual listing of points of interest (similar to the yellow pages).

No software is needed; the System will interface with existing GPS. No more late updates from GOOGLE®, YAHOO®, etc.

Presently GPS providers, map providers, and search engines, and the like provide: CityNavigator and MetroGuide Maps that contain many thousands of attractions.

These include: Food and, Drink, Lodging, Attractions, Entertainment, Shopping, Services, Transportation, Emergency and Government offices. In most areas, the maps provided are not updated and sometimes provide misleading information. Some of the waypoints listed appear to be about 2 years old. Listed Attractions include theme parks, museums, libraries, schools, parks and such. This feature is very useful in an unfamiliar area. Waypoints will be located automatically in the local area and plotted on the map screen. The waypoints can be stored on the' GPS database for future access.

Our innovation will revolutionize the GPS based systems and the mapping industry, from GPS, mapping companies' communication providers, car manufacturers to yellow pages and local guides; for the first time the user of a GPS navigation system will have an easy reliable way to reach a destination.

The most common problem with today's GPS based systems is that the mapping and the waypoints are not updated on a timely basis. Our innovation is the solution for this problem. Using the disclosed innovation, the user will know where he/she is, be able to identify "landmarks" around him/her accurately, and receive automatic updates directly from the points of interest in the vicinity.

Our innovation is based on RF tag or information to be sent to RF/FM or satellite radio broadcaster for each waypoint or point of interest, each tag or waypoints has its own ID (identifying the waypoint by type, address, etc.). The sensors/tags will broadcast, via RF, to interface with existing navigation systems. GPS based systems display, as floating information, on the GPS map referenced to the user's location. The floating display will provide automatic waypoint updates and will allow the user to search local providers (waypoints/store). This is accomplished without any connections, communication, Internet or cellular use. The communication is provided directly between the tags and/or sensor, the FM broadcaster, or any other similar device and the user's GPS system.

The fact is, no digital maps are entirely accurate. A user needs to know which map makers are used by the product that they are interested in and check the maps for the area that they are concerned about. In addition some map databases are created from vector data while others are just scanned copies of paper maps. In addition to mapping data these same map makers can often provide POI (points of interest) data. However, a software company might use the maps from one company and the POI data from another. POI data normally takes three forms. One is public buildings, parks, airports, and possibly geographic objects. A second is government locations that include specialized points lists like marker buoys, and airplane marker. Finally, there are commercial establishments, which usually include some information about their product and contact data. Note that the location of commercial places is often derived from the street address and is not based on the actual latitude/ longitude location. More over there is the sky rock cost of digitizing and updating the POI and the way points.

The task at hand is to provide a solution where the user will receive real-time point of interest or waypoints in the area where he is automatically to his existing navigation system or to his cellular phone, the waypoints information can be information that are real-time information update in real-time and can be change according to the waypoints, the information can be as the Examples applications:

The user may wish to locate an empty available parking space in his vicinity. This process considers each empty parking space as a waypoint.

The user may wish to see and locate the real estate property available in his/her area according to his location.

The user may wish to locate a specific store in a shopping mall, each store in a mall is a waypoints or a particular aisle in a department store, or a specific item on a shelf.

The user may wish to locate a specific conference room in a convention center, or a point of interest in an amusement park or a point of interest in a museum.

The user may wish to find the emergency exit route in time of emergency or the first response team need to navigate in a facility in emergency situation.

The user may be looking for a train location in a station, or stops in a subway or underground train system. All of which (waypoints, information, etc.) is being updated in real-time.

It is believed that the automatic waypoint update concept will revolutionize the GPS and Navigation Industry.

For the first time the user will know what they want, when they want the information and according to their location.

The local business owner can introduce his content in real-time to the (navigation) users located in area of the local business.

The GPS and navigation industry can tap to the huge local advertising market (estimate at 134B in US alone).

The Navigator.

The navigator, cellular phone application Bluetooth application or existing GPS navigation. The user will receive the data broadcast or by the tags in the vicinity via the interface with a cellular telephone utilizing the cellular phone's Bluetooth capability or from a FM broadcaster via RDS is a standard from the European Broadcasting Union for sending small amounts of digital information using conventional FM radio broadcasts. The RDS system standardizes several types of information transmitted, including time ad station identification. RDS is standard in Europe since the early 90s, but less so in North America.

Radio Broadcast Data System is the official name used for the U. S. version of RDS, though the "RDS" name seems to be at least as common in usage. The two standards are nearly identical, with only slight differences, mainly in which numbers are assigned to each of 31 musical and other programming formats the RBDS system can identify. RBDS was approved by the NRSC, RDS by the EBU. Both use a 57 kHz subcarrier to carry data at 1187.5 bits per second. The 57 kHz was chosen for being the third harmonic (3×) of the pilot tone for FM stereo, so it would not cause interference or intermodulation with it, or with the stereo difference signal at 38 kHz (2×). The data format utilizes error correction.

It is important to note that no cellular communication or Internet or database access is needed, and that any Bluetooth enabled device will operate the navigator application as a stand-alone device. The disclosed system will interface with existing in-car navigation systems. What is suggested is that the waypoint or POI will be represented by the following examples, according to the type of the POI:

| PTY code | POI: type | Waypoint category type |
| --- | --- | --- |
| 32 | Food/Restaurants | Food |
| 33 | Gas Station | Information |
| 34 | ATM/Banks | Finance |
| 35 | Department Store | store |
| 36 | Apparel | Store |
| 37 | Sports | Store |
| 38 | Books/Video | Store |
| 39 | Jewelry | Store |
| 40 | Toys/Photo/Elec. | Store |
| 41 | Music | Store |
| 42 | Gifts | Store |
| 43 | Furnishing | Store |
| 44 | Service | Service |
| 45 | Computer | Store/Service |
| 46 | Hairstyle/Cosmetics Store | Store/Service |
| 47 | office | office |
| 48 | Security/police | Service/emergency |
| 49 | Children's program | Service/store |
| 50 | Social Affairs | Religious service |
| 51 | Religion | Religious |
| 52 | Phone | service |
| 53 | Travel | Transportation service |
| 54 | parking | Transportation service |
| 55 | Guest service | service |
| 56 | Library | service |
| 57 | Transportation | Transportation service |
| 58 | Municipal | |
| 59 | Post office/Mail | service |
| 60 | Government | |
| 61 | Market | Store/service |
| 62 | Alarm | Emergency |

The Display Method.

The display method is a unique way to bridge existing devices like cellular phones, in-car navigation and other Bluetooth devices. The solution provides the overlay waypoints displayed over the existing navigation system, as a real-time floating display, or as a waypoint to overcome the limitations of GPS based systems and the existing mapping systems.

The disclosed navigation system method will enable remote planning based on downloaded local floor-plans, or local navigation, when the location's floor plan can be downloaded at the destination. An example of this would be at the entrance of a shopping mall, department store, amusement park, museum, parking garage or the down town area of a city.

The system can work inside a building whereas GPS cannot. Local detection is obtained via popular Bluetooth interface.

The system provides information about each facility/store, including information about the type of the facility, for example: type of store or product etc.

By providing the ability to locate a the user in an area using a Bluetooth enabled device, or a cell phone with the disclosed navigation application, the system overcomes the anxiety of "Where will I am" and also facilitates finding a parked car later via the RTP (Return to Parking) feature.

The system has the capability to perform all the functions of a search for and can become the "Next generation search out of the box".

The disclosed system can be an attractive additional feature for cities that intend to deploy Wi-Fi.

In case of an emergency or security situation, the system can provide authorities with information.

Utilizing the disclosed innovation, the facilities (waypoints) in the vicinity around the user car are displayed on a floating overlay using either a cellular phone application, or a stand-alone device, or an existing installed navigation system with or without any mapping.

The recent introduction of imagery services, such as GOOGLE EARTH® and its competitors, which are offered as an enhancement to GPS at a fee, still provide out of date information, with the unsatisfactory result that users encounter road changes and area development not shown on the maps and imagery.

Navigation using the mapping or floor-plan of a location can be offered as an additional service.

The option of downloading a floor-plan can be exercised either remotely or locally.

With the disclosed innovation, you have the information that you want, when you want it, where you want it (and at an affordable price).

Once you are in the vicinity of your destination and you switch on your navigation device, you will automatically receive the facility information along your waking route and in all directions around you.

No further action is required, there is no need to send a request or to access the Internet/web or log-on and search a database or central system.

Other systems must have bandwidth available, over which to send a request to a central system, or to a database, and then must wait for a response. This takes time!

Even if the other systems have bandwidth, they are still based on the existing search concept where under the user submits a query, searches and waits for the response. All impractical while the user need the information immediately. The disclosed system provides the information automatically, without submitting any query, and the response takes into account the user's location.

The disclosed unique approach does not need an Internet bandwidth or cellular communication at all.

And as a result there is no delay or waiting for communication and access time, the communication is instantaneous, directly between the waypoints and the user's navigation device.

Additionally, each facility type can color-coded to identify the type of the store etc., e.g. restaurants, men's wear, women's wear etc. the store type, real estate property, garage sale location, special sale and all up to date real time information that can't be display and locate in today navigation system, and tapping to the local business industry know as local advertising.

Each color-coded display of facility can be accessed to obtain complete information about the store e.g., automatic waypoint information.

The ability to operate the disclosed innovation using the associated application on a cellular phone, the navigator, with no need for cellular connection, or on any stand alone Bluetooth enabled device, and not limit to a GPS navigation system.

Moreover, the disclosed innovation can solve the "RTP" (Return to parking) problem, where many forget where they parked their car. The system has an option to save the location on the "cellular phone—parking detector" application, which will make it easy to locate the parked car.

The disclosed solution is designed for global use and is not limited to malls, stores, amusement parks, museums, sports stadiums etc. It can be implemented in parking garages or parking spaces metered or not, almost anywhere and in any place.

In the future, all new construction will have the tags included in the design.

The disclosed invention integrates the navigation as part of the NAV4 concepts where it will provide complete solutions for local navigation in an area where the GPS and GPS mapping just can't provide accurate and update information that so essential to the user.

A typical application is navigating a pedestrian in an environment like a mall, department store, specialty store, conference, trade show, amusement park, university, hospital, school, municipal building, museum, subway, train station, airport, down town center, any type of parking facility, or any place when and where GPS cannot be provided or is not accurate or precise enough. The system will be used for navigation by first responders to emergencies or disasters.

The disclosed system method is part of the broad suite of applications that include a complete solution to the user from the time that he parks, or begins looking for a space to park his car, walking to the store/mall to when he wants to return to his parked car, looking for the place that he parked.

The suite includes:

Parking detector- and navigation to the empty available parking space.

Nav4 mall/store navigation solution inside mall store.

RTP—return to parking—locate the place that you parked your car.

For example, a typical application could be:

A pedestrian asks the way in a mall to a specific store.

A pedestrian asks the way inside the store, to a specific aisle or product.

A shopper in a department store asks for a specific department.

A pedestrian asks the way to a point of interest.

In an emergency, the first response team has to navigate inside a smoke filled building.

A system and method to provide user information which related to the point of interest.

The disclosed system provides detection and navigation reference, position determination and information related to the object—point of interest, directly and automatically to the user interface-cellular phone without any communication help of Internet/web or cellular needed.

Special operation mode: Shopping (Referred to as NAV4SALE) provides navigation to the special sale item in a department store. A new unique tool for the business owner as well to the customers would be a tool which enables a user to navigate and locate an item in a store, a mall, or other sales outlet to one or more items that are offered on a special sale. This will provide the user with a method to navigate indoors and/or outdoors to the waypoint representing a special sale, a coupon, a special event, a promotion, and the like. This would be considered as an add-on to local advertising.

The local advertising market is estimated (at the time of writing of this Application) to be $134 Billion in the US alone. The mapping feature is the "forefront" of a local strategy, due to the lack of availability to use GPS within an indoor environment as well with the limitation of its accuracy in an outdoor environment and the un-updated of the mapping that provides today by the mapping and GPS industry there is no real tapping to this huge market.

It is believed that the disclosed innovation can bring a new life to the navigation and mapping industry by providing a unique innovation that combines the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. A new unique way to bring the customers to the product on sale, direct the customer directly to the isle, and to the product that you want to move. The store will also have an option to deliver more content (advertising, sale, coupons, promotions, etc.) to the user when he approach the store or already is inside via Bluetooth push to the user cellular Bluetooth enable.

In an exemplary operating mode adapted for displays and event (referred to as NAV4Museums NAV SHOW and NAV CONFERENCE, the process provides navigation and interactive information from the museum's show or the conference exhibition to the user's cellular phone device via Bluetooth interface.

Explore museum or conference show exhibits in a new unique and easy way, find your way around when navigating on the floor map of the museum conference or the show, indoor navigation, navigate to exhibits restaurants, cafes, lavatories etc., all to the user navigation or cellular phone.

Any Museum, Conference, or show provided to the attended a mapping to the exhibits, some provide also additional audio device (headset) to get more information on the exhibits.

The disclosed innovation will provide a unique indoor tools that will allow the attended to navigate the museum, conference or show in an easy way directly to his Bluetooth enable cellular phone, when he reach his desire exhibit he will allow to download directly to his cellular and or Bluetooth headset information about the exhibits. An indoor navigation to the exhibits as well to the restaurants, cafes, lavatories, and the like. All to the user's navigation system or cellular phone and based on the facility map.

In another exemplary application operating mode adapted for public and/or mass transportation (Referred to as Navtrain): For all the users of mass transportation system the disclosed innovation will allow, locate and point the user to the exact station or location on a route, an easy way to navigate in the train, subway, underground kind of system, a new way of "subway" or bus mapping in/out door. And directly to the user navigation or his cellular phone. Every day millions of people are using the mass transportation system, trains, subways, buses, each of the passengers depend on the transportation map for the route information as well as, schedules and additional services provided by the transportation system. Most of the passengers of today carry with them a cellular phone.

The disclosed unique innovation will provide the passenger with the navigation inside the transportation system directly to the passenger's Bluetooth enable phone, the passenger will know the exact location and/or station on a route. The process can also provide additional option information like stop locations, schedules, and the like. A new add-on service to the transportation providers as well to the passengers, utilize the disclosed indoor navigation method.

In another exemplary operating mode adapted for parking (referred to as NAV4PARKING (Detailed in two prior Parent patent applications: U.S. patent application Ser. No. 11/429,864 filed on May 8, 2006 (issued as U.S. Pat. No. 8,836,580 on Sep. 16, 2014) and U.S. patent application Ser. No. 11/396,843 filed on Apr. 3, 2006 (issued as U.S. Pat. No. 7,899,583 on Mar. 1, 2011)), the process detects empty parking spaces and navigates the user to the available parking locations.

A new generation of the urban parking innovation answers one of the most demanding need of any driver: Knowing where to park, or more precisely, finding and navigating a driver to one or more of the empty parking spaces in a proximity of the driver. The system can also provide an answer to a "where did I park my car?" syndrome, by directing a driver to the parked car when the drive is returning to the parked car. In our society, where time, convenience and comfort are precious commodities, parking can be a major perk or major headache.

Parking Detection System can be a next generation solution for urban parking and provides an answer to one of the most demanding needs of any driver; "Where to park?"

The disclosed system, a method of self organizing sensors' network can enable municipalities and other parking authorities to easily identify, exploit and manage revenue opportunities while at the same time providing better service at a lower operating cost. With the implementation of the disclosed system, navigating and detecting available parking spaces will become part of the information revolution.

With the disclosed system, drivers will save time and reduce the frustration of hunting for parking spaces, and will also save money on gas use and car maintenance costs.

By using and modifying existing technology, the disclosed system will integrate easily with other transportation and communication systems. The RF sensor can be attached to existing parking meters, and in the future will interface with them and eventually will replace them.

Municipalities will have better control and centralized monitoring of their parking space inventory, resulting from the new generation of urban parking.

In another exemplary application operating mode adapted for real estate (referred to as NAVRealty), the process provides a new unique tool to accommodate the real estate industry by providing the seller, the real estate agent, and/or the real estate customer to locate and navigate to the available real estate property in the user area, according to the user's location and directly to the user's GPS navigation system and/or the user's cellular phone.

According to the newspaper association of America, the real estate advertising market is estimate at $11.5 Billion (at the time when this application was originally written). Recently Mynewplace joined apartments.com which is in the estimated $3 Billion market on-line apartment listing (at the time when this application was originally written). ZILLOW®, a new startup company just raised $32 M (as of the original filing date of this Application) in founding with base idea to put your house on GOOGLE EARTH® (satellite mapping). GOOGLE®, YAHOO®, AOL®, ASK® and MICROSOFT® are looking to develop real estate product.

It is believed that the disclosed unique innovation bring the listing to the user's hand, by combining the GPS navigation and or cellular phone the user will be allowed to get the real estate property in his area according to his location in real time without need for any communication, such as an Internet connection or a cellular communication network.

The user even will have the option to "search out of the box" of property in his area. The disclosed innovation will serve as a new tool for the real estate industry as well to the search eng. For the benefit of the seller and/or the real estate agent as well as the real-estate customer.

In another exemplary application operating mode adapted for retail establishments (referred to as NAV4STORE and/or NAVMALL), the process provides navigation inside a store, a department store, and the like to a specific department, aisle and/or specific product, with an option for advertising and/or presenting a special promotion. Explore the indoor mall or inside a department store, navigate to the right place in the store or the department that a user is looking for.

Navigate on the mall map and/or store mapping to find your way around all using your cellular phone or navigation system without a GPS. A new kind of service and new marketing way for the malls and/or store business owners; an add-on to local advertising.

The local advertising market estimates (as the time of writing of this application) to be $134 Billion in US alone. The mapping is the "forefront" of a local strategy, due to the lack of availability of the GPS indoor as well with the limitation of its accuracy outdoor and the un-updated of the mapping that provide today by the mapping and GPS industry there is no real tapping to this huge market.

It is believed that the disclosed innovation can bring a new life to the Navigation and mapping industry by providing a unique innovation that combine the GPS and the existing navigation as well as the cellular phone users with an indoor navigation based on the local map and/or mall that will provide the user a navigation to his desire location in the mall/store to the right store and/or product even isle inside the store as well a new marketing tool to the store and/or mall owner to get the customer with a new service. The store will have also an option to deliver more content (advertising, sale, coupons, promo etc.) to the user when he approach the store or already is inside via Bluetooth push to the user cellular Bluetooth enable.

In another exemplary application operating mode adapted for amusement parks (referred to as (Referred to as NAVThemePark), the process provides navigation and other benefits throughout Theme Parks and Amusements Park. The process provides navigation to direct a user to their desire attraction as well with a new way for register for an accelerated placement in line (such as a DISNEY® FAST PASS®). The current accelerated placement requires the guest to visit a fast pass dispenser located at the ride. The current invention enables a user to accomplish is using the user's cellular phone without use of a GPS system. Provide a new media and on-line service.

Ever wonder what it will be like to navigate inside the amusement park to a desired attraction; know schedules of shows, events, and the like, within the theme or amusement park; and even to get your accelerated placement in line like from a remote instead of standing in line.

With the disclosed unique innovation all can be become reality and directly to your cellular phone without the need for a GPS. It is believed that the disclosed innovation can provide a new tool and service to the benefit of the amusements parks as well to the user.

In another exemplary application operating mode adapted for amusement parks (referred to as (Referred to as NAV-SIGN): will provide the user with automatic generating waypoint of the road sign to be display on the user navigation and or cellular phone as a way for secure driving, the information can interface to the car computer to for example automatically slow down when enter school zone—NAV-SIGN.

In another exemplary application operating mode adapted for amusement parks (referred to as (Referred to as NAV EMERGENCY) provides support to a tactical team's first response team to navigate the team within the building(s) in which it has been deployed.

The disclosed method provides a low-cost, reliable system for firefighters and other first responders, inside buildings, to navigate, where a GPS is not reliable-indeed, the GPS signal may have been disabled temporarily to prevent exploitation by terrorists, or even more likely no signal can be received at all inside a building.

The disclosed system envisioned this limitation of GPS based systems, and is intended for an environment that is potentially much less "friendly", the environment inside a building that first responders encounter may contain smoke, dust, or flames, and is intended to leverage advances in ubiquitous RF/Bluetooth tag technology.

The disclosed system will exploit the capability of storing critical building information, such as the floor maps and the emergency escape plans, for retrieval and navigational assistance via a Bluetooth enabled cellular phone, when and where it is needed, More over the disclosed system can serve as a navigator for the emergency exit route when and where needed each user can load the emergency exit floor plan and escape with the knowledge of his exact location in that route.

Aspects of the scenarios to be included:
Identifies and tracks the user (a first response team member).
Provides the user with navigation information and directions for safely exiting of the building.
Provides location information of all team members, via an ad hoc network of radio terminals that combine RF/Bluetooth readings and radio communication.

From the outset, the disclosed system was been designed with the capability to utilize existing technology so it can be deployed as a stand-alone system, or in tandem with existing systems. We focused on technology already in place that simply needs to be expanded.

With the implementation of the disclosed system, a first response team will be empowered to navigate and find its way in a case of emergency or a disaster. This capability can be a critical life saving power in modern congested urban living conditions, not available before now.

It is believed that implementation of the disclosed system will assist counter terrorism activities and more importantly will help the first response teams to save the lives of people trapped inside buildings.

It is believed that implementation of the disclosed system will assist counter terrorism activities and more importantly will help the first response teams to save the lives of people trapped inside buildings. It can save life.

Waypoint Navigation

A waypoint is a fixed location with known address location, longitude and latitude and coordinates. The disclosed navigation system is capable of storing a database of waypoints for the following purpose:

Waypoints mark a destination, a point along the way to a destination, or a point of reference. Normally, in navigating, a "route" consists of one or more waypoints. To traverse a route, the user navigates to the nearest waypoint, then to the next one in turn until the destination is reached. The system has the ability to compute a great-circle route towards a waypoint, enabling them to find the shortest route even over long distances. The system enabling users to locate a destination on a map and define it as a waypoint. The system is intended for navigation; it can generate a suggested route between two waypoints, based on the cartographic database. The system indicates the user's current location and gives advance notice of an upcoming point.

Because the system knows the waypoint positions, and the distance between them it, it is easy to determine the user's exact location.

Map Matching

The navigation solution is further enhanced, although it is not essential, when the system knows that the person or object being located is traveling along known routes on a map; for example, the system can assume that people can only follow certain routes in a mall. This is priori information that can be used to "force" the estimated position to be on the nearest point on the possible routes. The constraints of indoor construction similarly can be used to refine estimates of the position of a person or object moving within a building-people and objects do not pass through walls, they pass along corridors and through doorways. It is a best solution for a system in case of an emergency or for a system for homeland security or a system to locate and inform the subway location, a good example is the hotel exit floor map.

In all, the disclosed unique method can be summarized as following:

Direct communication between the area (waypoints) and the user (navigation/GPS).
Automatic waypoint generation in real-time according to the user area.
Indoor/outdoor even without GPS.
Business model when the business/store owner will be subscribe to be listing in the navigation/GPS mapping Provide overlay floating model to be work even without mapping No Internet or cellular communication needed.
Can utilize the RDM or FM broadcasting to be interface to the existing navigation system.

The option of search is done locally on the user device, no central database or Internet search needed Bluetooth interface to cellular phone, will run as application on the Bluetooth enable device as cellular phone Provide indoor navigation and indoor facility mapping and navigation.

All GPS navigation system lacks of real-time display of the waypoints around the driver/user route, most likely, the information of the GPS mapping are old and not so accurate.

The disclosed system—a system and method for generate and update in real time navigation's waypoints automatically along the route will offer for the first time delivering real time waypoint information along the user route directly to the user navigation and or his cellular phone.

The disclosed system will enable a circular omnidirectional display of color code waypoint floating overlay on existing navigation map provided by the GPS providers system.

The waypoint data generate directly from the waypoints, no Internet or cellular communication may need.

The disclosed system will bridge the existing navigation system and GPS mapping to new real time information according to the user location.

The disclosed system will allow for the first time to the navigation and GPS industry to tap to the local advertising market estimates to be $134 Billion (at the time this application was drafted) in US alone. The mapping is the "forefront" of a local strategy, due to the lack of availability of the GPS indoor as well with the limitation of its accuracy outdoor and the un-updated of the mapping that provide today by the mapping and GPS industry there is no real tapping to this huge market.

It is believed that the disclosed innovation can bring a new life to the Navigation and mapping industry as well to the cellular providers by providing a unique innovation that combine the GPS and the existing navigation to the real time information directly from the waypoints, or as coined a new COOLSPOT.

BRIEF DESCRIPTION OF THE DRAWINGS

A better understanding of the present invention may be obtained by reference to the accompanying drawings, which should be considered in conjunction with the detailed description, all in accordance with the present invention.

DESCRIPTION OF THE PREFERRED EMBODIMENT

Figure 1:
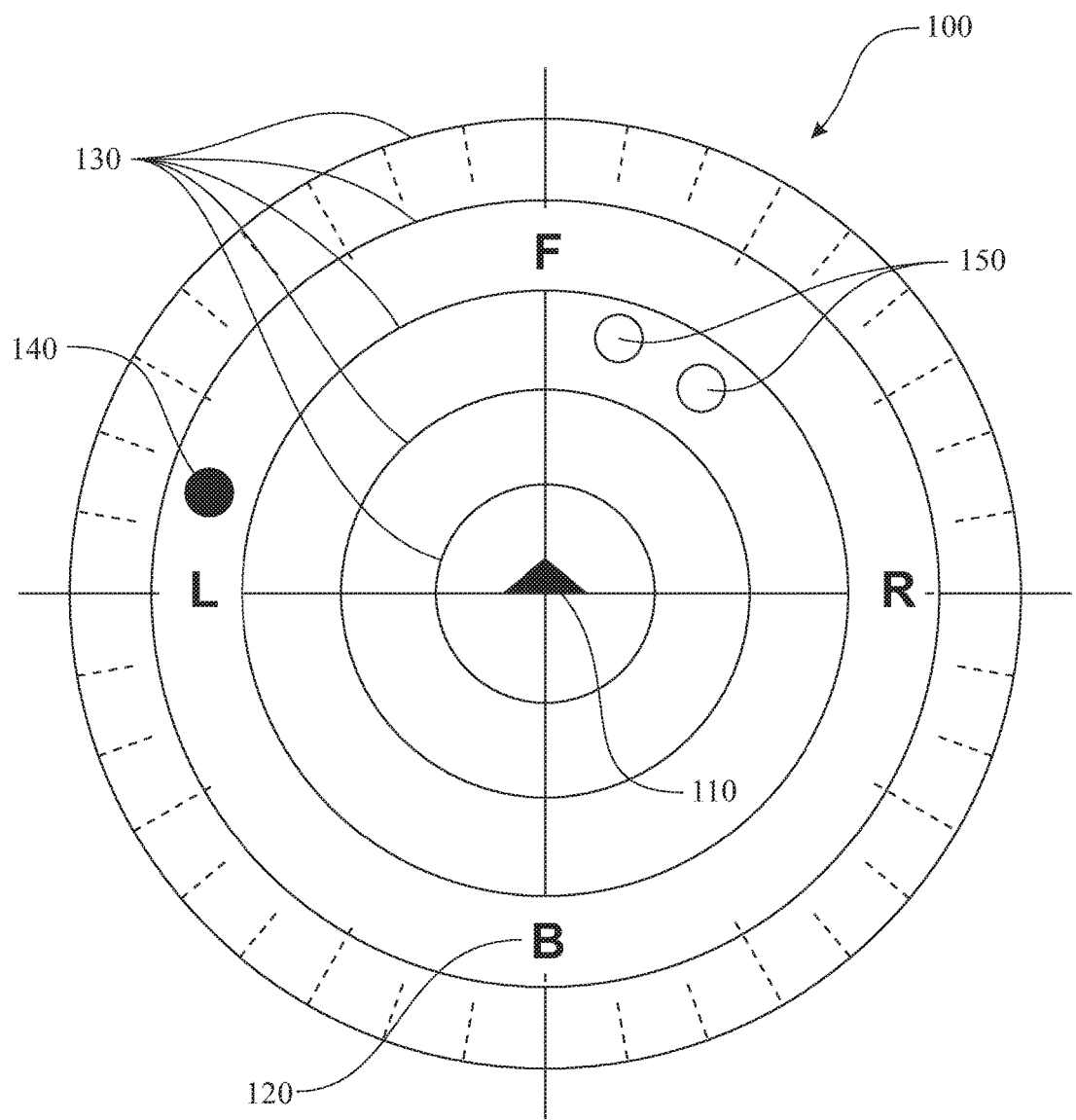
FIG. 1 presents a schematic diagram illustrating an exemplary floating display method as an application operating on a cellular phone or on an existing GPS navigation device in accordance with the present invention.

In all the figures of the drawings, sub-features and integral parts that correspond to one another bear the same reference symbol.

Referring now to the drawings in detail and first particularly to FIGS. 1-9 thereof.

These figures illustrate the method and system to generate and display automatically waypoints along a route for navigation system or application on a cellular phone.

Referring to FIG. 1, its show The method contain the floating overlay display 100, a real-time floating overlay omnidirectional circular display to overcome the limitations of the GPS based systems and the existing mapping systems.

The user will have easy way to figure out the distance and the direction to the waypoint without GPS or any mapping.

The waypoint will be displayed inside the graphical real-time omnidirectional circular display in such way that the user will intuitively determine the distance and the direction to the waypoints.

Each waypoint will be shown with a simple color code to identify the type of the waypoint e.g. 150 for example with green color will represent a restaurant where 140 in color red for example will represent a Gas station and so on for each king of waypoints.

Each color code display of a waypoint can be access to obtain complete information about the waypoint e.g. business type and automatic waypoint information.

Each circular line 130 represents 50 feet in distance from the user/car. This makes it easy for the user to calculate the distance to the waypoints.

Moreover to make it easy to determine the directions and the location of the waypoints 140 and 150 the display circular divide into four (4) parts represented by the following orientation indicators: orientation indicator B 120 identifies back respective to the driving direction; orientation indicator 110 represents the car heading; orientation indicator R identifies a right direction respective to the current driving direction; orientation indicator L identifies a left direction respective to the current driving direction; and orientation indicator F identifies a front or forward direction respective to the current driving or heading direction.

Each of the waypoints 140 and 150 are result of the broadcast directly from the waypoints in the area of 300' around the user car or broadcast a FM signal (ROS) via FM broadcaster or cellular radio provider.

A very small RF sensor installed in each waypoint, any place designated as waypoints either store, parking space, real estate property for sale, places on the road inside or outside public or commercial properties. The sensor can be a Radio Frequency IDentification (RFID) (long range type), a long range Bluetooth based device, a Wi-Fi based device, or any other type of RF device. The RF sensor broadcasts a unique ID by wireless that identifies the location of the waypoints 140 and 150 (unique ID, address, and type). The transmitted signal is picked-up (received) by the detector 100.

In one application, each of the waypoints will send information to the FM broadcaster using either an FM receiver or a cellular radio that will be sending RDS FM information to the interface with the existing GPS system and will be presented on the circular display using a color coding.

The overlay add-up device/display can work even without mapping at all, such as by using a display similar to a VOR display used in aircraft navigation (similar to the add-up display) will show the waypoints in the immediate area without the need for a mapping background. No regenerating of the mapping is necessary.

Figure 2:
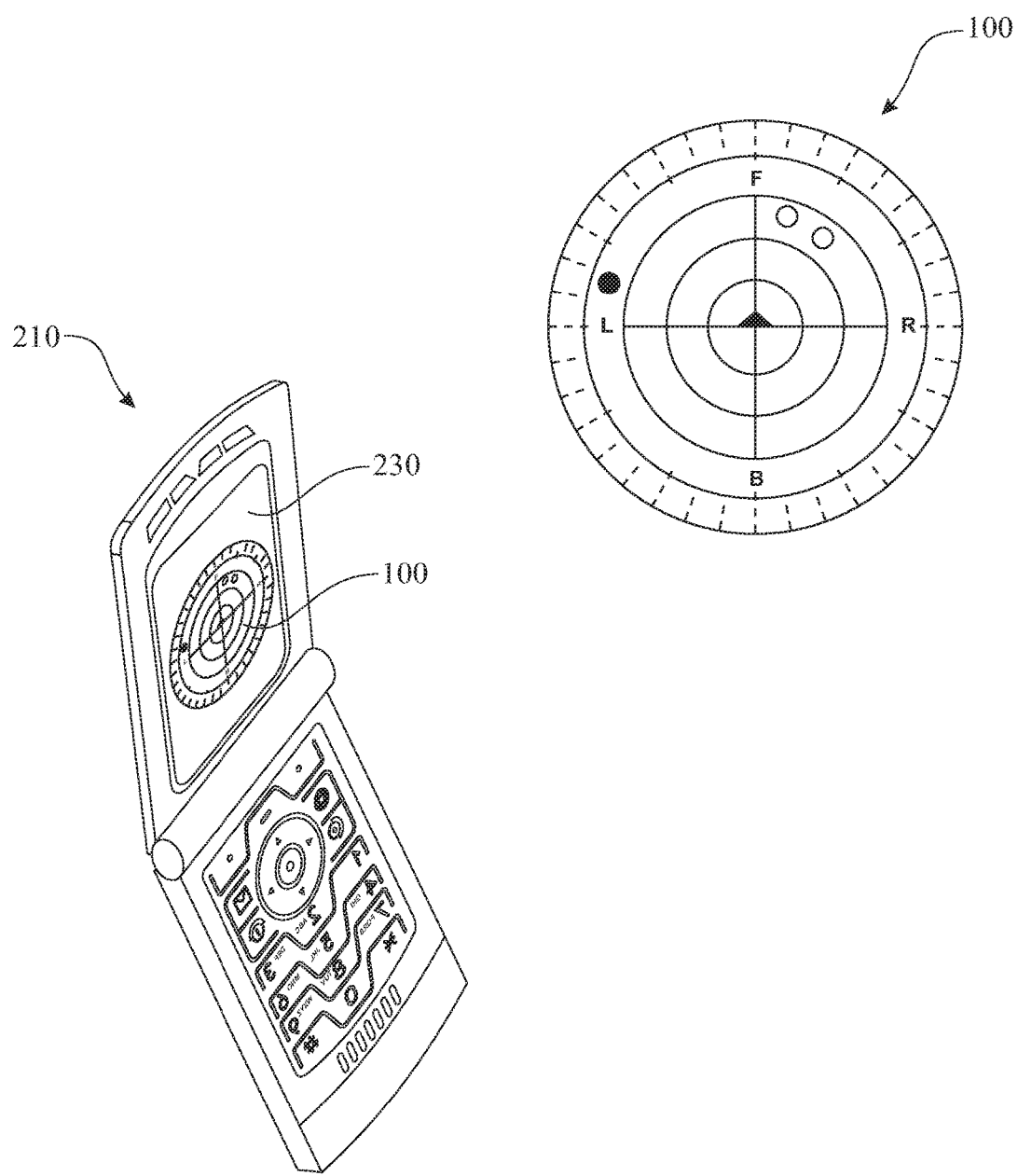
FIG. 2 presents a schematic diagram illustrating an exemplary application of the navigation process in use on a cellular phone.

Referring to FIG. 2, the floating overlay waypoint detector 100 is displayed on a cellular phone 210. The floating overlay waypoint detector 100 is provided as a Bluetooth cellular telephone application. The floating overlay waypoint detector 100 does not need to utilize any cellular communication. The floating overlay waypoint detector 100 can operate without a requirement to access the Internet or any other web communication, or any communication to a central system. The application can additionally accomplish all of the desire features exclusive of any need to access a database.

The process utilizes a cellular phone 210 only as a Bluetooth enabled device and an application of an overlay floating circular display 100 waypoint detector, which operates over an existing GPS mapping program or over a background of an area floor plan 230. The area floor plan 230 can be downloaded during use or before it is needed. Examples include obtaining the floor plan 230 prior to arriving at a respective parking area, a floor plan 230 prior to entering a store/mall building, and the like. The user would plan ahead and obtain the respective map or floor plan 230 prior to arriving at the location or download the respective map or floor plan 230 using Bluetooth, Wi-Fi, or other communication process as the user arrives at the respective parking area or the entrance to the indoor area.

Again, the map 230 or floor plan 230 is displayed as a background and is not critical to the navigation, as the user will have easy time to determine and locate and navigate to the waypoint (example to empty parking spaces) without the background mapping or the floor plan, no generation of mapping needed at all.

Moreover, a user can make the cellular phone 210 a waypoint detector (exclusive of a need to utilize any cellular communication or Internet access) by using the Bluetooth function of the cellular telephone. This enables the user to have the same functions even if the user's vehicle is not equipped with a built-in navigation system. The user will have the option to determine the waypoints in the area by using their Bluetooth enabled cellular telephone as a navigator.

It must be explained that there is a difference between using the cellular phone 210 to receive information from the web or central database to the method when the cellular phone using the waypoint detector Bluetooth application will received directly information broadcast directly from the area waypoints.

Figure 3:
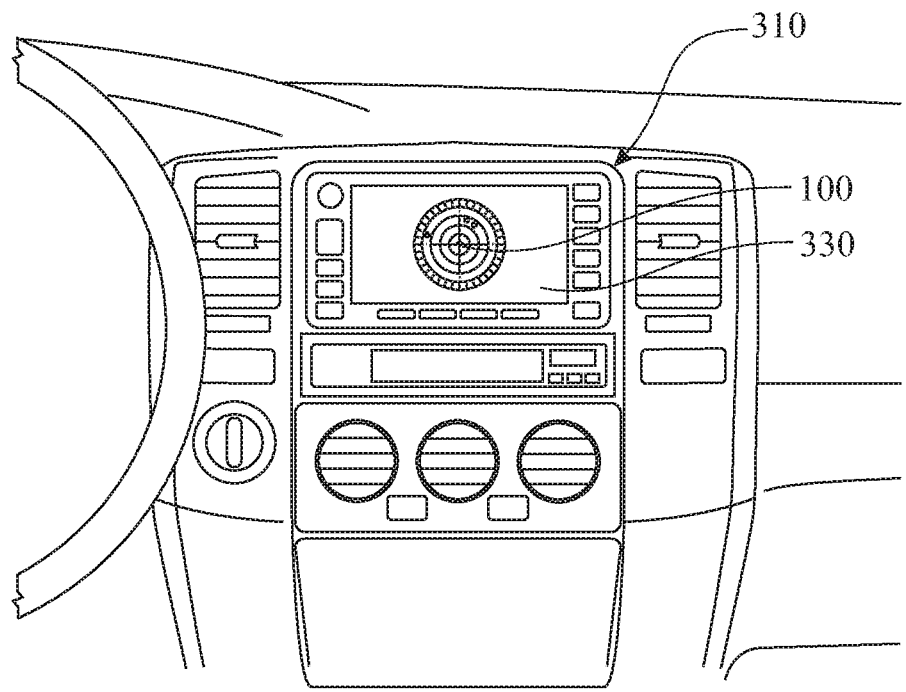
FIG. 3 presents a schematic diagram illustrating an exemplary application of the navigation process in use on a navigation system integrated into a vehicle.

Turning now to FIG. 3, the floating overlay waypoint detector 100 is displayed on an existing car navigation system 310.

The floating detector 100 on the car navigation 310 utilizes a Bluetooth interface. This enables functionality of the system without any need for cellular communication, any Internet web communication, or any communication to a central system. The system also does not need to access a database.

The detector providing the operation of the overlay floating circular display 100 will run over either GPS existing mapping or over a background of the area floor plan 330 that can be downloaded before accessing the area to plan ahead or downloaded using a Bluetooth communication link or a Wi-Fi communication link at an entrance to the mall/store. This can be applied to either an indoor environment and/or and outdoor environment.

Again, the mapping 330 or floor plan background is not critical to the navigation as the user will have an easy time determining, locating, and navigating to any of the waypoints without the background mapping or the floor plan. Essentially, the process can be accomplished without a need to generate any mapping.

Figure 4:
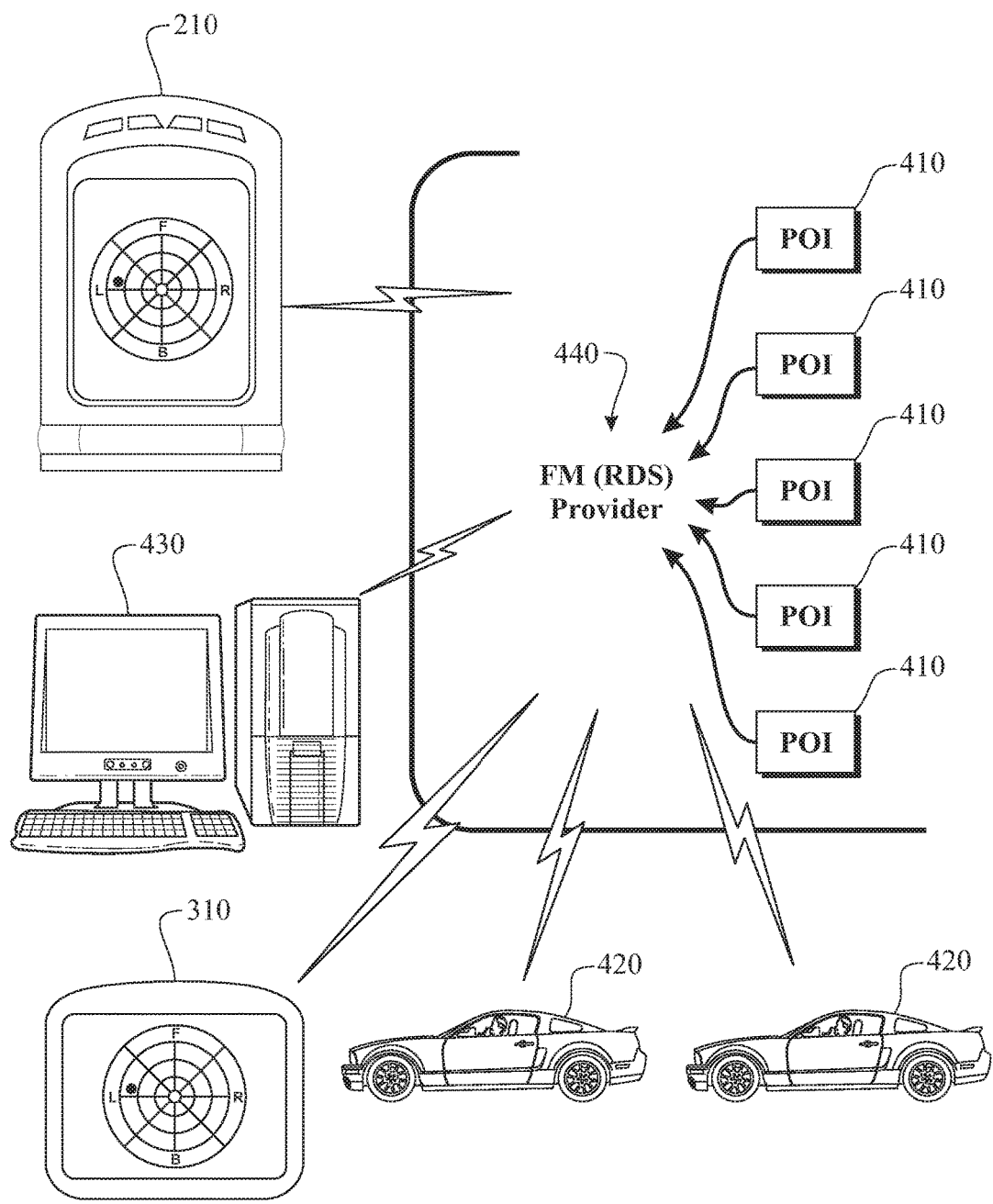
FIG. 4 presents an exemplary schematic diagram of a method of automatically updating waypoints using a FM broadcaster (RDM) method.

Referring to FIG. 4, each waypoint or Point of Interest (POI) 410 sends information (waypoints information) to the FM provider 440. The FM provider 440 or the cellular radio broadcasts the waypoint information via Radio Directional Signal (RDS) to the user where information associated with each store/waypoint 410 will have a basic information, such as a store name, a phone number, a floor, an address within the mall, and small notes (small information representing the store). The user will receive the information automatically on the respective device, in real time, and according to the vicinity of the receiving device, wherein the receiving device can include the user's vehicle 420, the user's navigation system 310 and/or the user's cellular telephone 210.

Figure 5:
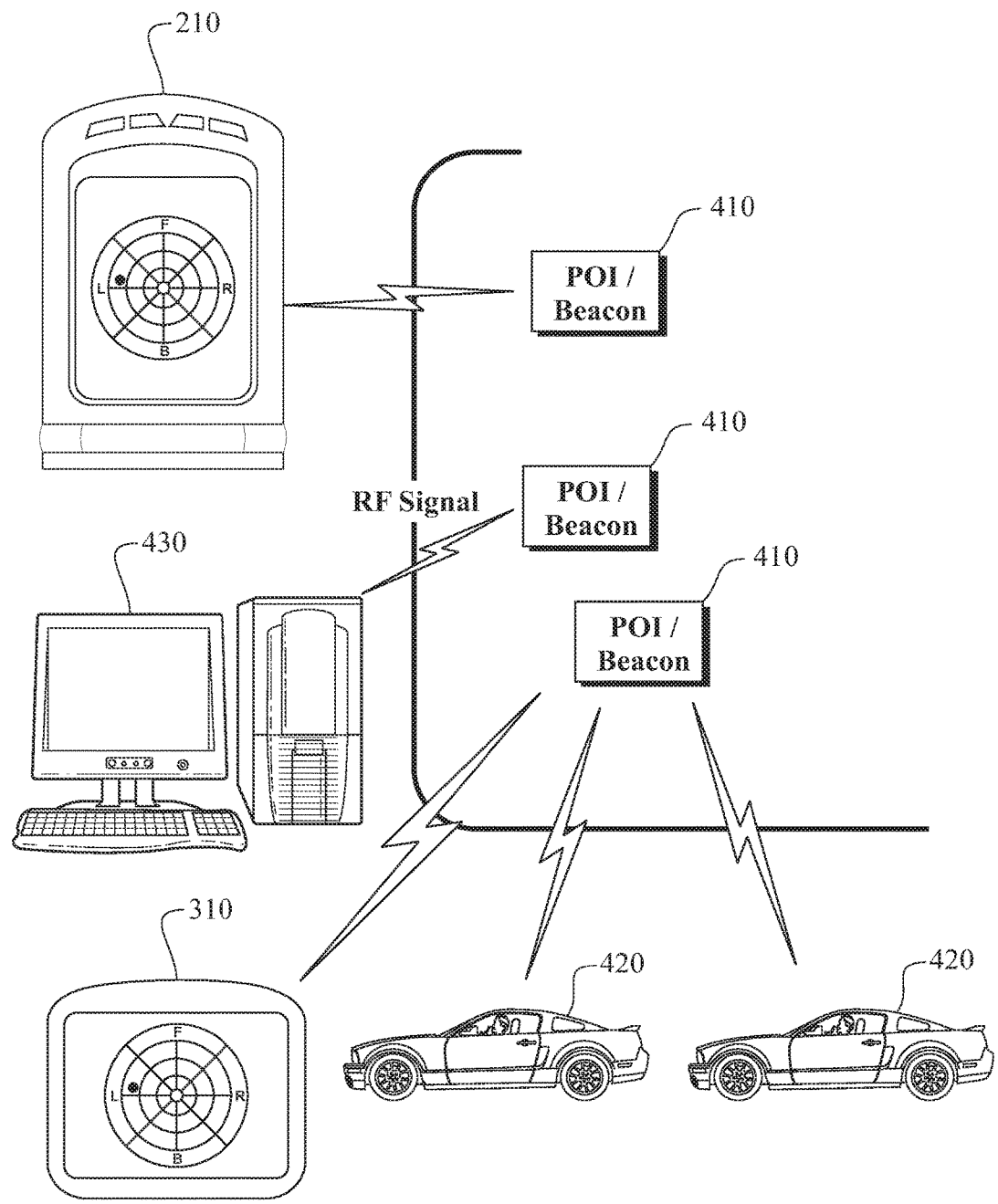
FIG. 5 presents an exemplary schematic diagram of the method of automatically updating waypoints directly between the waypoints and the user's navigation system.

Turning to FIG. 5, the illustration presents an exemplary scenario of the system when the user reaches the area close to any waypoint 410. Again when the user approaches a way point 410 the user will be able to receive additional information regarding the store/product directly from the waypoints on the user's cellular telephone 210, the user's vehicle navigation system 310, another suitable device within the user's vehicle 420, or any other Bluetooth enabled device. The additional information can include special promotions, coupons, advertising or special sales, and the like. The additional information would be received and presented to the user using the Bluetooth enabled application on any suitable Bluetooth enabled device.

The promotion can be also delivering via a Bluetooth voice option utilize the Bluetooth options.

Figure 6:
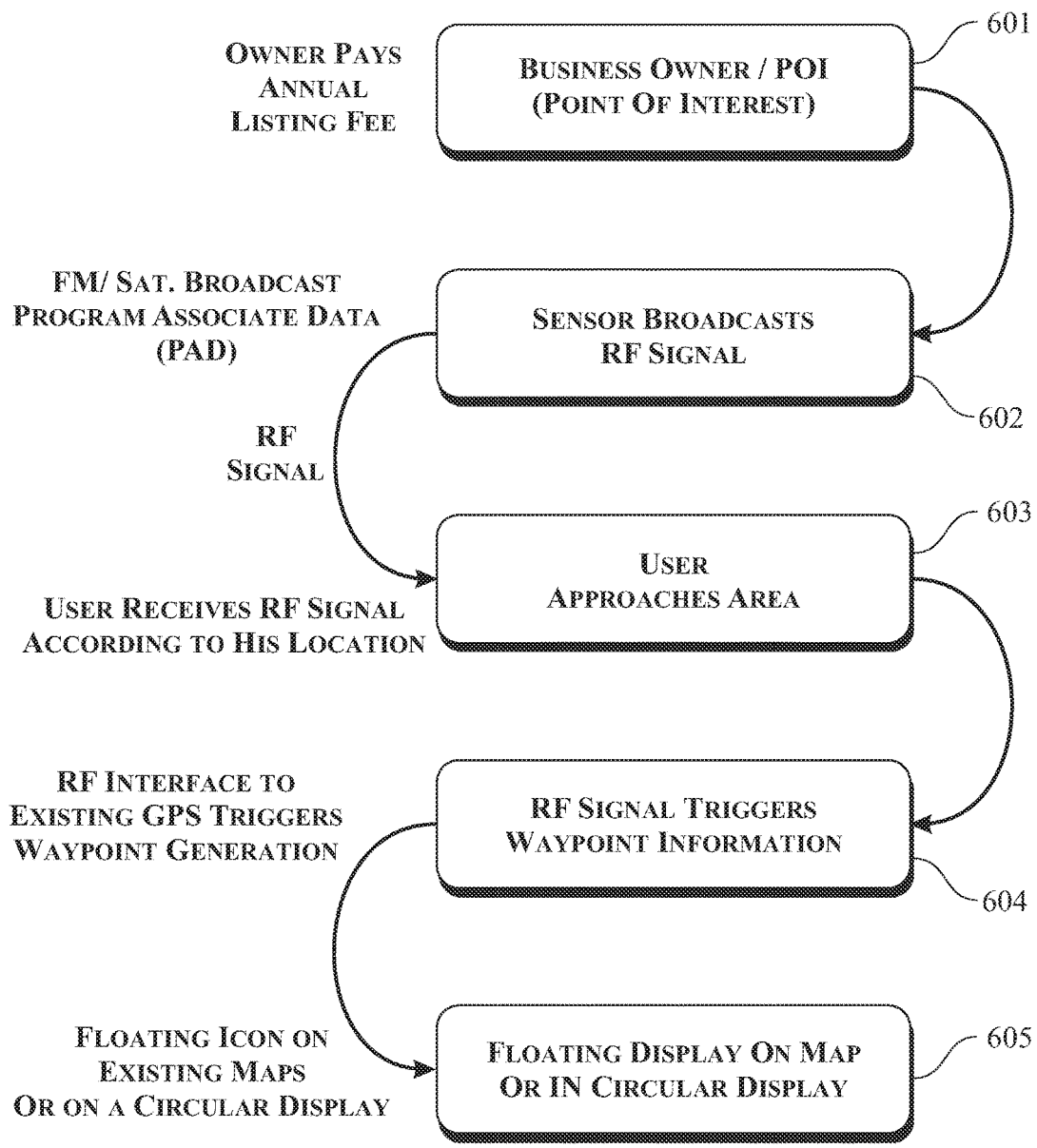
FIG. 6 presents a flow diagram of an exemplary method of automatically updating waypoints.

An exemplary flow diagram illustrating a method using the system is presented in FIG. 6. The process can provide a business model that would be implemented using the method where each waypoint can be designated as business owner/store or Point of Interest (POI) 601. The business would pay a listing fee (periodic, such as weekly, monthly, quarterly, annually, etc.) to be included in the interface with the GPS as a waypoint. This would be analogous to the YELLOW PAGES®, but would be a real-time, on-time application. Each waypoint 410 will send information to the FM broadcaster (or cellular radio) 602 that will send/broadcast Program Associated Data (PAD) via RDS to be interfaced to the user GPS navigation 603. As the user approaches the area, the information is received by the Navigation system 603. The received signal will trigger a waypoint generation 604. The device will then display the waypoint as a floating display upon a GPS mapping or without any mapping at all in a floating circular display 605.

Figure 7:
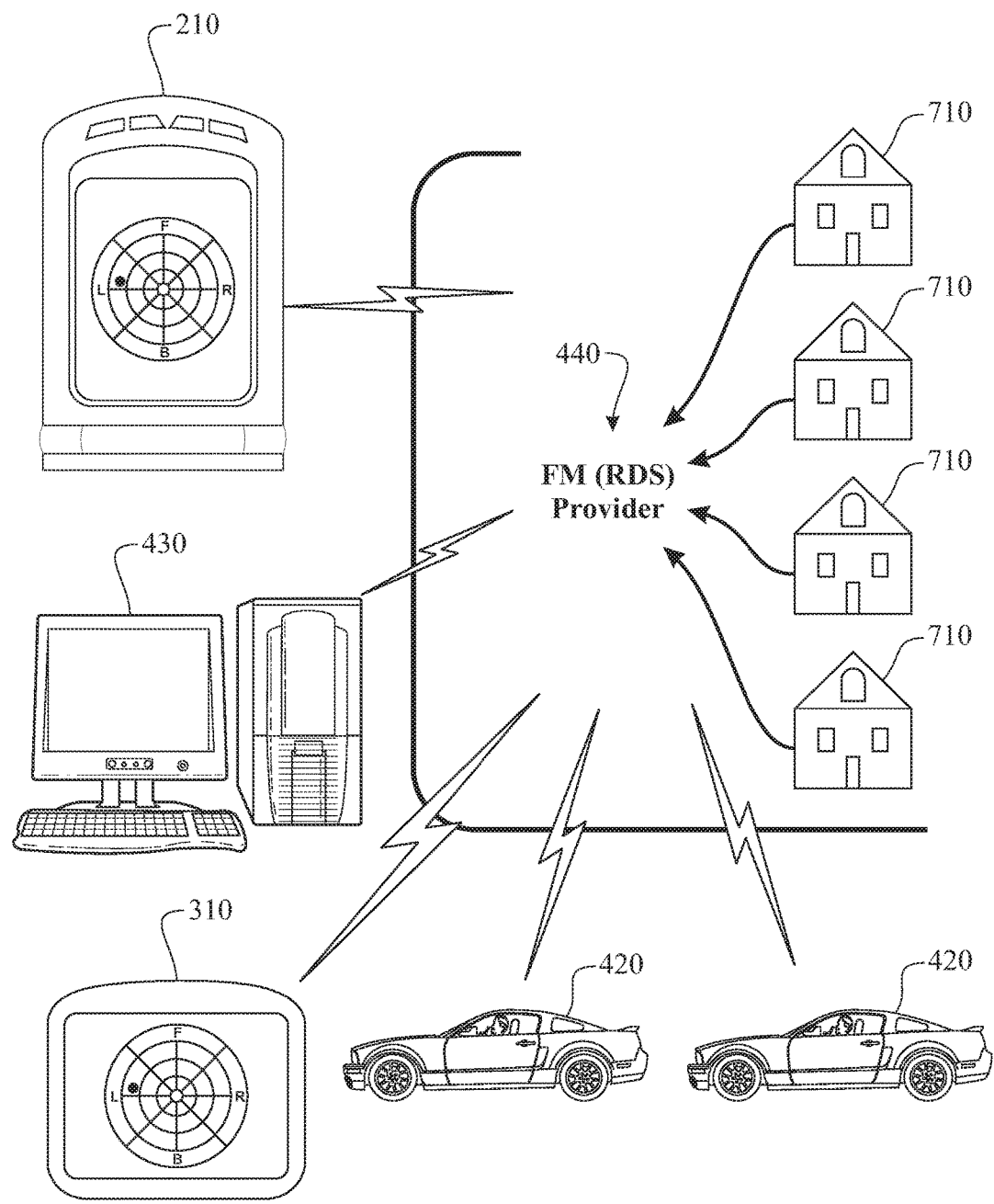
FIG. 7 presents an exemplary schematic diagram of the method of automatically updating waypoints as described in FIG. 4, wherein the method is adapted to an exemplary application referred to as NAV REALTY.

One exemplary application is presented in FIG. 7. The exemplary application, referred to as NAV REALTY, identifies and presents a location of each real estate property that is offered for sale or for rent in the area proximate the user. This solution provides a unique approach, utilizing the process described above to identify waypoints 710 that are real estate properties 710. The information is sent to the FM provider 440; the FM provider 440 or the cellular radio broadcast the waypoint information pertaining to the real estate 710 to the receiving system within the user's car 420, to the user's car navigation system 310, and or to the user's cellular telephone 210. The information is automatically provided according to the user's location directly between the waypoint (real estate in this example) and the user navigation. Alternatively, the waypoint 710 can be also store outdoor or indoor, where the respective application is referred to as NAV STORE, NAV MALL. In another application, the waypoints can be parking spaces (located indoors or outdoors), where the respective application is referred to as NAV PARKING. In yet another application, the waypoint 710 can identify a special sale, where the respective application is referred to as NAV SALE. In yet another application, the waypoint 710 can identify an exhibit in a museum or show or conference, where the respective application is referred to as NAV MUSEUM or NAV CONFERENCE AND NAV SHOW. In yet another application, the waypoint 710 can identify an exhibit and/or attractions in amusements parks, where the respective application is referred to as NAV THEME PARK. The waypoint 710 can identify a train location and/or information associated with the train, where the respective application is referred to as NAV TRAIN. In yet another application, the waypoint 710 can identify exit emergency information.

In the application referred to as NAV emergency, the system provides real-time and automatic waypoint generation along a route with interface to the existing GPS navigation and to the cellular phone.

A typical application is navigating a pedestrian in an environment like a mall, a department store, a specialty store, a conference, a trade show, an amusement park, a university, a hospital, a school, a municipal building, a museum, a subway, a train station, an airport, a down town center, any type of parking facility, or any place when and where GPS cannot be provided or is not accurate or precise enough. The system will be used for navigation by first responders during emergencies or disasters.

The method describe is the basic for the suite of applications The suite can include:

Parking detector and navigation to empty, available (vacant) parking spaces.

Nav4 mall/store navigation solution inside a mall and/or a store.

Return to Parking (RTP) is used to locate the parking space or other parking location where the user parked their car.

For example, a typical application could be:

A pedestrian asks the way in a mall to a specific store.

A pedestrian asks the way inside the store, to a specific aisle or product.

A shopper in a department store asks for a specific department.

A pedestrian asks the way to a Point of Interest (POI).

In an emergency, the first response team has to navigate inside a smoke filled building.

A system and method to provide user information which related to the point of interest (POI).

The disclosed system provides detection and navigation reference, position determination and information related to the object or point of interest (POI), directly and automatically to the user interface-cellular phone without any communication help of Internet/web or cellular needed.

Figure 8:
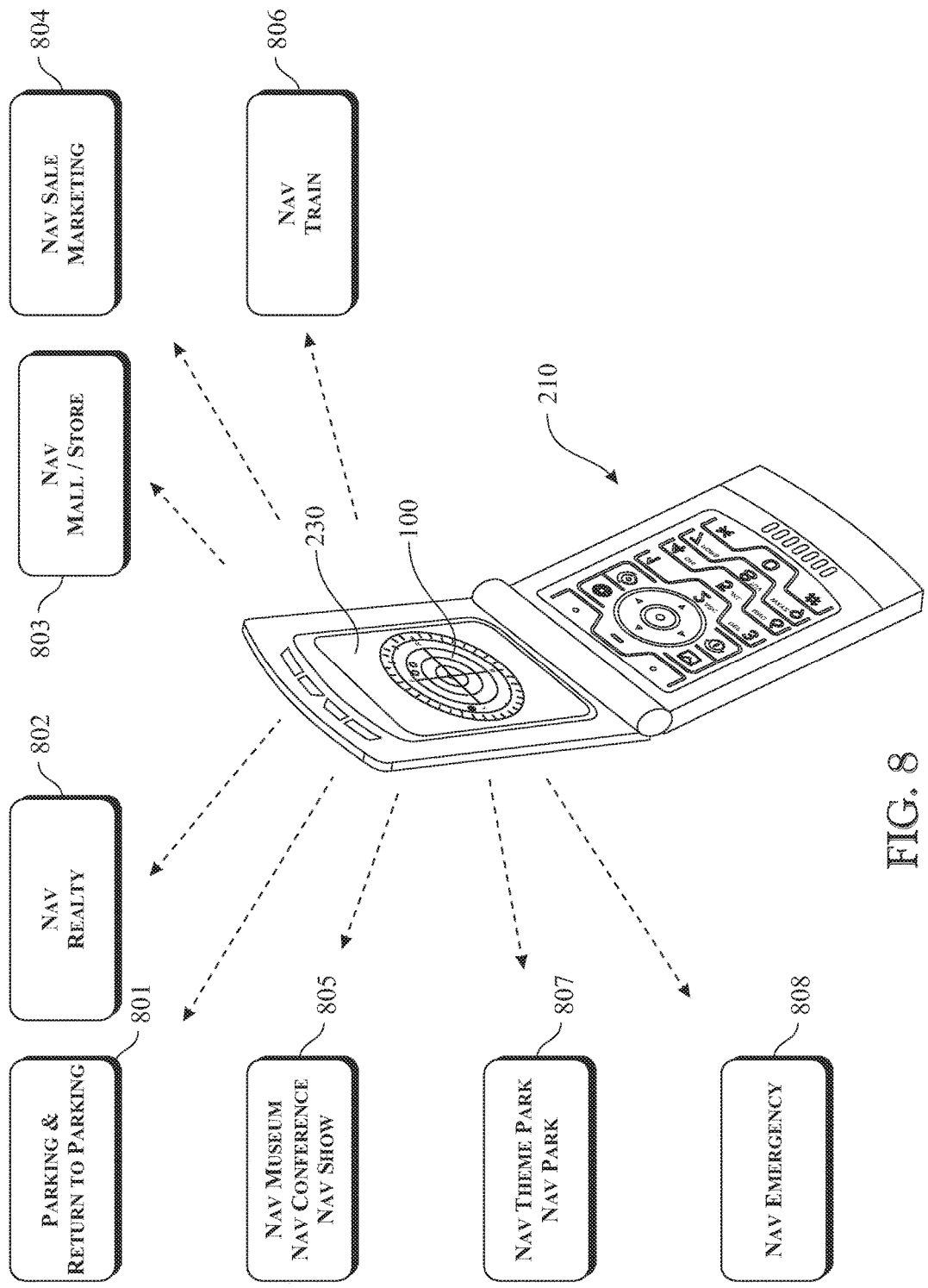
FIG. 8 presents a schematic diagram illustrating a variety of applications of the that can be used on the cellular phone.

A series of offered applications is presented in FIG. 8. The possibility applications for automatic waypoints generation utilize the cellular phone 210 with the floating circular display 100, wherein the application displays a waypoint as a floating element displayed upon GPS map in the background 230 or without use of any map (as shown).

In one exemplary operating mode adapted for parking (referred to as NAV4PARKING and Return to Parking 801), detects available or vacant parking locations and provides the information and navigation about the associated empty parking spaces to the user's device (such as the cellular telephone 210).

A new generation of urban parking innovation answers the most demanding need of any driver: Knowing where to park, or more precisely, identifying and providing navigation to empty parking spaces in and around the driver. This can also provide the answer to "Where did I park my car?", when returning to the location of the parked car. In a society where time, convenience, and comfort are precious commodities, parking can be a major perk or a major headache.

Parking Detection System can be a next generation solution for urban parking and provides an answer to one of the most demanding needs of any driver; "Where to park?"

The disclosed system, a method of self organizing sensors' network will enable municipalities and other parking authorities to easily identify, exploit and manage revenue opportunities while at the same time providing better service at a lower operating cost. With the implementation of the disclosed system, navigating and detecting available parking spaces will become part of the information revolution.

With the disclosed system, drivers will save time and reduce the frustration of hunting for parking spaces, and will also save money on gas use and car maintenance costs.

By using and modifying existing technology, the system will integrate easily with other transportation and communication systems. The RF sensor can be attached to existing parking meters, and in the future will interface with them and eventually will replace them.

Municipalities will have better control and centralized monitoring of their parking space inventory, resulting from the new generation of urban parking.

In another exemplary application operating mode adapted for realty (referred to as NAVRealty 802), the application provides a new tool to accommodate the real estate industry by providing the seller, the real estate agent and/or the real estate customer with a capability to locate and navigate to available real estate property in the proximity of the user. This would be provided according to the location of the user and the information would be provided directly to the user's GPS navigation system and/or the user's cellular phone 210.

According to the newspaper association of America, the real estate advertising market is estimate at $11.5 Billion (as the time of the writing of this application). Recently MYNEWPLACE® joined apartments.com and rent.com in the $3 Billion on-line apartment listing. ZILLOW®, a new startup company just raised $32 M in founding with base idea to put your house on GOOGLE EARTH® satellite mapping, GOOGLE®, YAHOO®, AOL®, ASK® and MICROSOFT® are looking to develop real estate products.

It is believed that the unique innovation bring the listing to the user's hand, by combining the GPS navigation and or cellular phone the user will be allowed to get the real estate property in his area according to his location in real time without need for any communication, Internet or cellular.

The user even will have the option to "search out of the box" of property in his area. The disclosed innovation will serve as a new tool for the real estate industry as well to the search eng. For the benefit of the seller/the real estate agent as well as the real-estate customer.

In another exemplary application operating mode adapted for retail establishments (Referred to as NAV4STORE and NAVMALL 803), provides navigation inside a store and/or a department store to a specific department/aisle or specific product, with option for advertising method and special promotion. Explore the indoor mall or inside a department store, navigate to the right place or the store or the department that you need.

Navigate on the mall map and/or store mapping to find your way around all using your cellular phone or navigation system without a GPS. A new kind of service and new marketing way for the malls/store business owners. An add-on to local advertising.

The local advertising market estimates to be $134 Billion (at the time of this Application) in US alone. The mapping is the "forefront" of a local strategy, due to the lack of availability of the GPS indoor as well with the limitation of its accuracy outdoor and the un-updated of the mapping that provide today by the mapping and GPS industry there is no real tapping to this huge market.

It is believed that the disclosed innovation can bring a new life to the Navigation and mapping industry by providing a unique innovation that combine the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. The store will have also an option to deliver more content (advertising, sale, coupons, promo etc.) to the user when he approach the store or already is inside via Bluetooth push to the user cellular Bluetooth enable.

In another exemplary application operating mode adapted for retail establishments (Referred to as NAV4SALE 804), the application provides navigation to the special sale item in a department store. A new unique tool for the business owner as well to the customers-to navigate and locate Item in a store/mall that is on a special sale, will provide the user a way to navigate in/out door for the "waypoint" represent special sale, coupon, special event, promotion, and the like. This could be included as an add-on to a local advertising method.

The local advertising market estimates (as the time of this filing) to be $134 Billion in the US alone. The mapping is the "forefront" of a local strategy, due to the lack of availability of the GPS indoor as well with the limitation of its accuracy outdoor and the un-updated of the mapping that provides today by the mapping and GPS industry there is no real tapping to this huge market.

It is believed that the disclosed innovation can bring a new life to the navigation and mapping industry by providing a unique innovation that combines the GPS and the existing navigation as well as the cellular phone users with an indoor navigation based on the local map/mall that will provide the user a navigation to his desire location in the mall/store to the right store/product even isle inside the store as well a new marketing tool to the store/mall owner to get the customer with a new service. A new unique way to bring the customers to the product in sale, direct the customer directly to the isle and to the product that you want to move. The store will also have an option to deliver more content (advertising, sale, coupons, promo etc.) to the user when he approach the store or already is inside via Bluetooth push to the user cellular Bluetooth enable.

In another exemplary application operating mode adapted for events (Referred to as NAV4Museums, NAV SHOW, and NAV CONFERENCE 805), provides navigation and interactive information from the museum's show or conference exhibition to the user's cellular telephone 210 via the Bluetooth interface.

Explore museum or conference show exhibits in a new unique and easy way, find your way around when navigating on the floor map of the museum conference or the show, indoor navigation, navigate to exhibits restaurants, cafes, lavatories, and the like. All of this information would be provided to the user's navigation or cellular phone.

Any Museum Conference or show provided to the attended a mapping to the exhibits, some provide also additional audio device (headset) to get more information on the exhibits.

The disclosed innovation will provide a unique indoor tools that will allow the attended to navigate the museum, conference or show in an easy way directly to his Bluetooth enable cellular phone, when he reach his desire exhibit he will allow to download directly to his cellular and or Bluetooth headset information about the exhibits. An indoor navigation to the exhibits as well to the restaurants, cafes, lavatories, and the like. All of this information would be provided to the user's navigation or cellular phone. The information would be based upon and could be displayed upon the respective facility map.

In another exemplary application operating mode adapted for public or mass transportation (Referred to as Navtrain 806), the application will allow, locate and point the user to the exact station or location on a route, an easy way to navigate in the train, subway, underground kind of system, a new way of "subway" or bus mapping in/out door. And directly to the user navigation or his cellular phone. Every day millions of people are using the mass transportation system, trains, subways, buses, each of the passengers depend on the transportation map for the route information as well as schedules and additional services provided by the transportation system. Most of the passengers of today carry with them a cellular phone. The disclosed innovation will provide the passenger with navigation inside the respective transportation system directly to the passenger's Bluetooth enabled phone. The passenger would know the exact location/station along the route. The application can additionally provide the user with optional information, such as schedules, and the like. A new add-on service to the transportation providers as well to the passengers, utilize the indoor navigation method.

In another exemplary application operating mode adapted for amusement parks (Referred to as NAVThemePark, NAVPark 807), the application enables navigation to a desired attraction as well with a new way for register to a accelerated position in line. All in an easy manner by using the user's cellular phone without a need for GPS. Provides a new media and on-line service.

Ever wonder what it will be like to navigate inside the amusements park to the desire attraction to know the schedules of the shows events at the attractions and even to get your accelerated position in line like from a remote location instead of standing in line or traveling to and visiting a dispenser to obtain a ticket defining the accelerated position in line or in the queue.

With the unique innovation all can be become reality and directly to your cellular phone without the need for a GPS.

It is believed that the disclosed innovation can provide a new tool and service to the benefit of the amusements parks as well to the user.

In another exemplary application operating mode adapted for emergency conditions (referred to as (Referred to as NAV EMERGENCY 808), the process provides support to a tactical team's first response team to navigate the emergency personnel within the building(s) in which the system has been deployed.

The disclosed method provides a low-cost, reliable system for firefighters and other first responders, inside buildings, to navigate, where a GPS is not reliable-indeed, the GPS signal may have been disabled temporarily to prevent exploitation by terrorists, or even more likely no signal can be received at all inside a building.

The disclosed system envisioned this limitation of GPS based systems, and is intended for an environment that is potentially much less "friendly", the environment inside a building that first responders encounter may contain smoke, dust, or flames, and is intended to leverage advances in ubiquitous RF/Bluetooth tag technology.

The disclosed system will exploit the capability of storing critical building information, such as the floor maps and the emergency escape plans, for retrieval and navigational assistance via a Bluetooth enabled cellular phone, when and where it is needed, More over the system can serve as a navigator for the emergency exit route when and where needed each user can load the emergency exit floor plan and escape with the knowledge of his exact location in that route.

Aspects of the scenarios to be included:
Identifies and tracks the user (a first response team member).
Provides the user with navigation information and directions for safely exiting of the building.
Provides location information of all team members, via an ad hoc network of radio terminals that combine RF/Bluetooth readings and radio communication.

From the outset, the disclosed system was been designed with the capability to utilize existing technology so it can be deployed as a stand-alone system, or in tandem with existing systems. We focused on technology already in place that simply needs to be expanded. With the implementation of the disclosed system, a first response team will be empowered to navigate and find its way in a case of emergency or a disaster. This capability can be a critical life saving power in modern congested urban living conditions, not available before now.

It is believed that implementation of the disclosed system will assist counter terrorism activities and more importantly will help the first response teams to save the lives of people trapped inside buildings.

It is believed that implementation of the disclosed system will assist counter terrorism activities and more importantly will help the first response teams to save the lives of people trapped inside buildings. It can save life.

Figure 9:
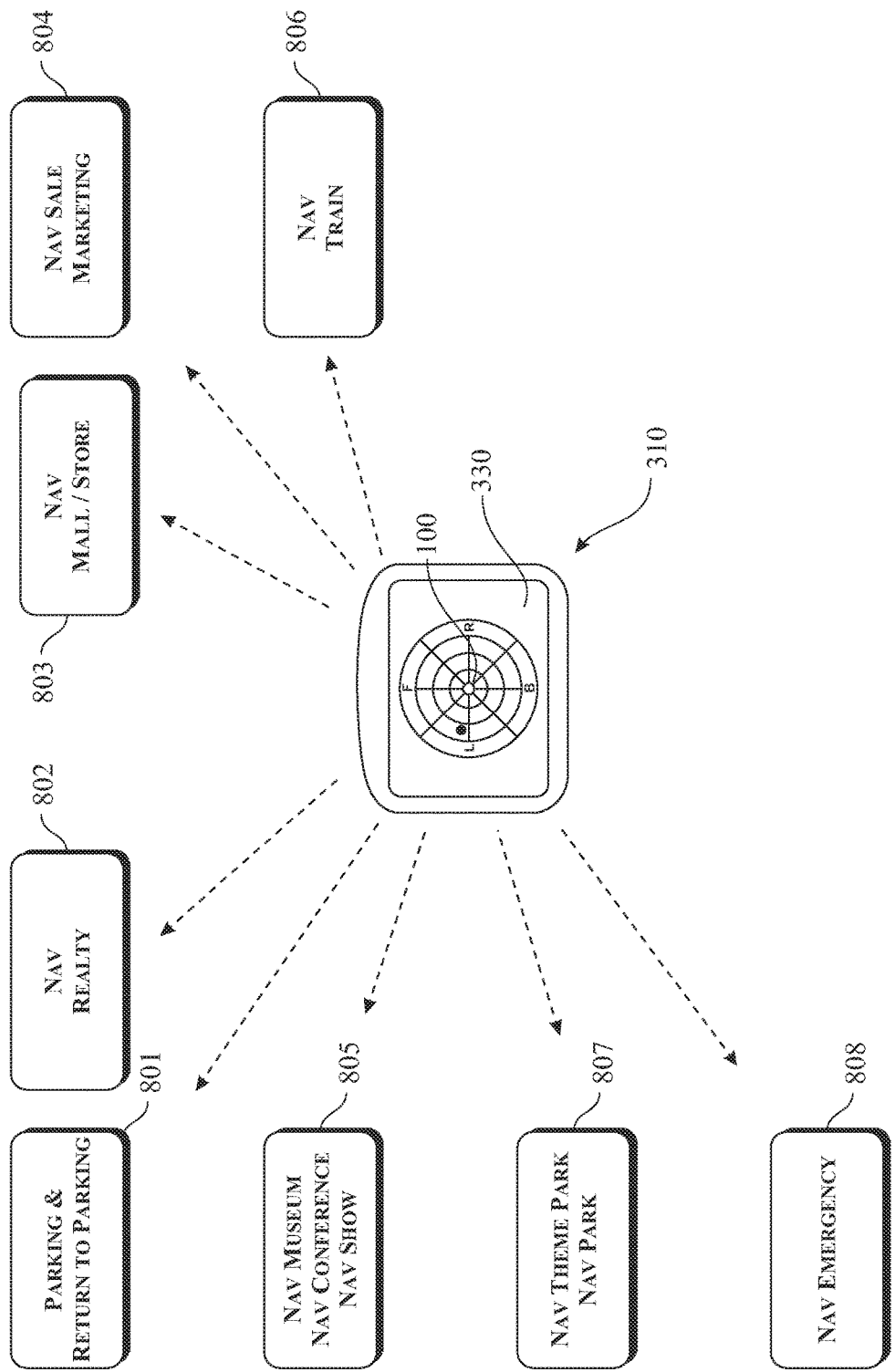
FIG. 9 presents a schematic diagram illustrating a variety of applications that can be used in conjunction with the navigation system.

Turning to FIG. 9. is an illustration of the possibility application for automatic waypoints generation utilize a car navigation 310 with the floating circular method 100 running and floating on GPS mapping in the background 330 or without any mapping.

In another exemplary application operating mode adapted for parking (referred to as (Referred to as NAV4PARKING and/or Return to Parking 801): This operating mode describes two (2) solutions, providing a process for identifying empty parking spaces and informing a user of the locations of the vacant parking spaces and can provide the user with navigation to a vacant parking location as well as providing a user with navigation back to a parking location where their car was parked.

A new generation of urban parking innovation that answers one of the most demanding needs of any driver: knowing where to park, or more precisely, finding and navigating a user to the empty parking spaces in proximity of the driver. Also will provide an answer to "where did I park my car?" syndrome, when returning to the parked car. In our society where time, convenience, and comfort are precious commodities, parking can be a major perk and/or a major headache.

Parking Detection System can be a next generation solution for urban parking and provides an answer to one of the most demanding needs of any driver; "Where to park?"

The disclosed system, a method of self organizing sensors' network will enable municipalities and other parking authorities to easily identify, exploit and manage revenue opportunities while at the same time providing better service at a lower operating cost.

With the implementation of the disclosed system, navigating and detecting available parking spaces will become part of the information revolution.

With the disclosed system, drivers will save time and reduce the frustration of hunting for parking spaces, and will also save money on gas use and car maintenance costs.

By using and modifying existing technology, the disclosed system will integrate easily with other transportation and communication systems. The RF sensor can be attached to existing parking meters, and in the future will interface with them and eventually will replace them.

Municipalities will have better control and centralized monitoring of their parking space inventory, resulting from the new generation of urban parking.

In another exemplary application operating mode adapted for amusement parks (referred to as (Referred to as NAV-Realty 802), provides a process to accommodate the real estate industry by providing the seller, the real estate agent, and/or the real estate customer to locate and navigate to any available real estate property in a proximity of the user. This would be based upon the location of the user's device. The information would be provided directly to the user's GPS navigation system and/or the user's cellular telephone.

According to the newspaper association of America, the real estate advertising market is estimate (at the time of writing this disclosure) at $11.5 Billion. Recently MYNEWPLACE® joined apartments.com and rent.com in the $3 Billion on-line apartment listing. ZILLOW®, a new startup company just raised $32 M in founding with base idea to put your house on GOOGLE EARTH® satellite mapping, GOOGLE®, YAHOO®, AOL®, ASK® and MICROSOFT® are looking to develop real estate product.

It is believed that the unique innovation bring the listing to the user's hand, by combining the GPS navigation and or cellular phone the user will be allowed to get the real estate property in his area according to his location in real time without need for any communication, Internet or cellular.

The user even will have the option to "search out of the box" of property in his area. The disclosed innovation will serve as a new tool for the real estate industry as well to the search eng. For the benefit of the seller I the real estate agent as well as the real-estate customer.

In another exemplary application operating mode adapted for product sales outlets (Referred to as NAV4STORE and NAVMALL 803), provides navigation inside a store and/or department store to a specific department/aisle or specific product, with option for advertising method and special promotion. Explore the indoor mall or inside a department store, navigate to the right place or the store or the department that you need.

Navigate on the mall map and/or store mapping to find your way around all using your cellular phone or navigation system without a GPS. A new kind of service and new marketing way for the malls/store business owners. An add-on to local advertising.

The local advertising market estimates (at the time of writing of this disclosure) to be $134 Billion in US alone. The mapping is the "forefront" of a local strategy, due to the lack of availability of the GPS indoor as well with the limitation of its accuracy outdoor and the un-updated of the mapping that provide today by the mapping and GPS industry there is no real tapping to this huge market.

It is believed that the disclosed innovation can bring a new life to the Navigation and mapping industry by providing a unique innovation that combine the GPS and the existing navigation as well as the cellular phone users with an indoor navigation based on the local map/mall that will provide the user a navigation to his desire location in the mall/store to the right store/product even isle inside the store as well a new marketing tool to the store and/or mall owner to get the customer with a new service. The store will have also an option to deliver more content (advertising, sale, coupons, promo etc.) to the user when he approach the store or already is inside via Bluetooth push to the user cellular Bluetooth enable.

In another exemplary application operating mode adapted for product sales locations (Referred to as NAV4SALE 804): This application provides navigation to the special sale item in a department store. A new unique tool for the business owner as well to the customers enables navigation to a user to help in locating an item within a store and/or mall that is on a special sale. This will provide the user with a way to navigate in/out door for the "waypoint" represent special sale, coupon, special event, a promotion, etc., an add-on to local advertising.

The local advertising market estimates (at the time of writing of this disclosure) to be $134 Billion in the US alone. The mapping is the "forefront" of a local strategy, due to the lack of availability of the GPS indoor as well with the limitation of its accuracy outdoor and the un-updated of the mapping that provides today by the mapping and GPS industry there is no real tapping to this huge market.

It is believed that the disclosed innovation can bring a new life to the navigation and mapping industry by providing a unique innovation that combines the GPS and the existing navigation as well as the cellular phone users with an indoor navigation based on the local map/mall that will provide the user a navigation to his desire location in the mall/store to the right store and/or product even isle inside the store as well a new marketing tool to the store and/or mall owner to get the customer with a new service. A new unique way to bring the customers to the product in sale, direct the customer directly to the isle and to the product that you want to move. The store will also have an option to deliver more content (advertising, sale, coupons, promo etc.) to the user when the user approaches the store or is already inside the store via Bluetooth push to the user cellular Bluetooth enable.

In another exemplary application operating mode adapted for displays and/or events (referred to as (Referred to as NAV4Museums NAV SHOW and NAV CONFERENCE 805), provides navigation and interactive information from the museum's show or conference exhibition to the user's cellular phone device via Bluetooth interface.

Explore museum or conference show exhibits in a new unique and easy way, find your way around when navigating on the floor map of the museum conference or the show, indoor navigation, navigate to exhibits restaurants, cafes, lavatories etc., all to the user navigation or cellular phone.

Any Museum Conference or show provided to the attended a mapping to the exhibits, some provide also additional audio device (headset) to get more information on the exhibits.

The disclosed innovation will provide a unique indoor tools that will allow the attended to navigate the museum, conference or show in an easy way directly to his Bluetooth enable cellular phone, when he reach his desire exhibit he will allow to download directly to his cellular and or Bluetooth headset information about the exhibits. An indoor navigation to the exhibits as well to the restaurants, cafes, lavatories etc., all to the user navigation or cellular phone and based on the facility map.

In another exemplary application operating mode adapted for public and/or mass transportation (Referred to as Navtrain 806), where the process enables all the users of mass transportation system to locate exact stations or locations along a route. Additionally, the process can point the user to the exact station or location on a route, an easy way to navigate in the train, subway, underground kind of system, a new way of "subway" or bus mapping independent of whether the location is indoors or outdoors. The process further provides navigation directly to the user's navigation system or the user's cellular telephone. Every day millions of people are using the mass transportation system, trains and/or subways, buses, each of the passengers depend on the transportation map for the route information as well as schedules and additional services provided by the transportation system. Most of the passengers of today carry with them a cellular phone. The disclosed unique innovation will provide the passenger with the navigation inside the transportation system directly to the passenger's Bluetooth enabled phone, the passenger will know exact location/station on the route as well with additional option information like schedules. A new add-on service to the transportation providers as well to the passengers, utilize the indoor navigation method.

In another exemplary application operating mode adapted for theme parks and amusement parks (Referred to as NAVThemePark, NAVPark 807), Theme and amusements Park navigation can navigate a user to their desire attraction as well with a new way for register for an accelerated placement in line (such as a DISNEY® FAST PASS®). The current accelerated placement requires the guest to visit a fast pass dispenser located at the ride. The current invention enables a user to accomplish is using the user's cellular phone without use of a GPS system. Provide a new media and on-line service.

Ever wonder what it will be like to navigate inside the amusements park to the desire attraction to know the schedules of the shows events at the attractions and even to get your "fast pass" like from a remote instead of standing in line. With the unique innovation all can be become reality and directly to your cellular phone without the need for a GPS. It is believed that the disclosed innovation can provide a new tool and service to the benefit of the amusements parks as well to the user.

In another exemplary application operating mode adapted for emergency conditions (Referred to as NAV EMERGENCY 808), the process adapts the indoor navigation techniques to enhance the ability of tactical team's first response team to navigate within the buildings in which it has been deployed.

The disclosed method provides a low-cost, reliable system for firefighters and other first responders, inside buildings, to navigate, where a GPS is not reliable-indeed, the GPS signal may have been disabled temporarily to prevent exploitation by terrorists, or even more likely no signal can be received at all inside a building.

The disclosed system envisioned this limitation of GPS based systems, and is intended for an environment that is potentially much less "friendly", the environment inside a building that first responders encounter may contain smoke, dust, or flames, and is intended to leverage advances in ubiquitous RF/Bluetooth tag technology.

The disclosed system will exploit the capability of storing critical building information, such as the floor maps and the emergency escape plans, for retrieval and navigational assistance via a Bluetooth enabled cellular phone, when and where it is needed, More over the disclosed system can serve as a navigator for the emergency exit route when and where needed each user can load the emergency exit floor plan and escape with the knowledge of his exact location in that route.

Aspects of the scenarios to be included:
Identifies and tracks the user (a first response team member).
Provides the user with navigation information and directions for safely exiting of the building.
Provides location information of all team members, via an ad hoc network of radio terminals that combine RF/Bluetooth readings and radio communication.

From the outset, the disclosed system was been designed with the capability to utilize existing technology so it can be deployed as a stand-alone system, or in tandem with existing systems. We focused on technology already in place that simply needs to be expanded. With the implementation of the disclosed system, a first response team will be empowered to navigate and find its way in a case of emergency or a disaster. This capability can be a critical life saving power in modern congested urban living conditions, not available before now.

It is believed that implementation of the disclosed system will assist counter terrorism activities and more importantly will help the first response teams to save the lives of people trapped inside buildings.

It is believed that implementation of the disclosed system will assist counter terrorism activities and more importantly will help the first response teams to save the lives of people trapped inside buildings. It can save life.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method contributing to automated driving of a vehicle, the method comprising steps of:
creating a database comprising known locations of waypoints, wherein the waypoints include traffic signs and information presented by each respective traffic sign;
determining a location of a vehicle;
detecting traffic signs that are in a vicinity of the location of the vehicle, wherein the detection of the traffic signs is accomplished based upon the determined location of the vehicle and the database;
obtaining information associated with a road sign in a proximity of the vehicle using the database;
conveying the information associated with a road sign to a computer integrated into the vehicle; and at least one of:
(a) displaying the information on a display within the vehicle;
(b) automatically causing a change in operation of the vehicle, wherein the change is based upon the obtained information associated with a road sign and speed limit.

2. A method contributing to automated driving of a vehicle as recited in claim 1, wherein the step of displaying the information on a display within the vehicle is accomplished by displaying the information associated with a road sign on at least one of:
(a) a vehicle display, and
(b) a vehicle navigation system.

3. A method contributing to automated driving of a vehicle as recited in claim 1, wherein the step of obtaining information associated with a road sign in a proximity of the vehicle is accomplished by receiving a transmission from a wireless transmitting device located proximate the road sign.

4. A method contributing to automated driving of a vehicle as recited in claim 1, the vehicle further comprising a wireless receiver integrated into the vehicle, wherein the step of obtaining information associated with a road sign in a proximity of the vehicle is accomplished by receiving a transmission from a wireless transmitting device located proximate the road sign using the wireless receiver integrated into the vehicle.

5. A method contributing to automated driving of a vehicle as recited in claim 1, wherein the information obtained from the road sign is a speed limit, the method further comprising a step of:
   adjusting a vehicle speed in accordance with the speed limit presented by the road sign.

6. A method contributing to automated driving of a vehicle of a vehicle as recited in claim 1, the method further comprising steps of:
   associating a waypoint with a vacant parking space;
   conveying waypoints associated with vacant parking spaces to a computer integrated into the vehicle;
   informing the user of locations of available parking spaces.

7. A method contributing to automated driving of a vehicle as recited in claim 1, the method further comprising a step of:
   aiding a user in a process of returning to a parking location where the vehicle is parked.

8. A method of providing assistance during a process of driving a vehicle, the method comprising steps of:
   creating a database comprising known locations of waypoints, wherein the waypoints include traffic signs and information presented by each respective traffic sign;
   accessing a driving assistance device;
   determining a location of the driving assistance device;
   detecting which traffic signs are in a vicinity of the location of the vehicle; wherein the detection of the traffic signs is accomplished based upon the determined location of the vehicle and the database;
   obtaining information associated with a road sign in a proximity of the driving assistance device using the database; and at least one of:
   (a) displaying the information on a display of the driving assistance device;
   (b) providing communication between the driving assistance device and a controller computer integrated into a vehicle, automatically causing a change in operation of the vehicle based upon the obtained information associated with a road sign.

9. A method of providing assistance during a process of driving a vehicle as recited in claim 8, wherein the driving assistance device is at least one of:
   (a) a computer integrated into the vehicle,
   (b) a vehicle navigation system integrated into the vehicle; and
   (c) a cellular phone.

10. A method of providing assistance during a process of driving a vehicle as recited in claim 8, wherein the step of displaying the information on a display of the driving assistance device is accomplished by displaying the information associated with a road sign on at least one of:
    (a) a display within a vehicle display,
    (b) a display of a vehicle navigation system, and
    (c) a display on a cellular phone.

11. A method of providing assistance during a process of driving a vehicle as recited in claim 8, wherein the step of obtaining information associated with a road sign in a proximity of the driving assistance device is accomplished by receiving a transmission from a wireless transmitting device located proximate the road sign.

12. A method of providing assistance during a process of driving a vehicle as recited in claim 8, the vehicle further comprising a wireless receiver integrated into the vehicle, wherein the step of obtaining information associated with a road sign in a proximity of the vehicle is accomplished by receiving a transmission from a wireless transmitting device located proximate the road sign using the wireless receiver integrated into the vehicle.

13. A method contributing to automated driving of a vehicle as recited in claim 8, wherein the information obtained from the road sign is a speed limit, the method further comprising a step of:
    adjusting a vehicle speed in accordance with the speed limit presented by the road sign.

14. A method of providing assistance during a process of driving a vehicle as recited in claim 8, the method further comprising steps of:
    associating a waypoint with a vacant parking space;
    conveying waypoints associated with vacant parking spaces to the driving assistance device;
    informing the user of locations of available parking spaces.

15. A method of providing assistance during a process of driving a vehicle as recited in claim 8, the method further comprising a step of:
    aiding a user in a process of returning to a parking location where the vehicle is parked.

16. A method of providing assistance during a process of driving a vehicle, the method comprising steps of:
    accessing a driving assistance device, wherein the driving assistance device includes at least one of a Radio Frequency (RF receiver), a Bluetooth receiver, a Wi-Fi receiver, and a cellular communication system;
    determining a location of the driving assistance device;
    detecting a road sign in a proximity of the driving assistance device using the at least one of the Radio Frequency (RF receiver), the Bluetooth receiver, the Wi-Fi receiver, and the cellular communication system,
    obtaining information associated with the road sign in a proximity of the driving assistance device using a respective communication protocol of the at least one of the Radio Frequency (RF receiver), the Bluetooth receiver, the Wi-Fi receiver, and the cellular communication system; and at least one of:
    (a) displaying the information on a display of the driving assistance device;
    (b) providing communication between the driving assistance device and a controller computer integrated into a vehicle, automatically causing a change in operation of the vehicle based upon the obtained information associated with a road sign.

17. A method of providing assistance during a process of driving a vehicle as recited in claim 16, wherein the driving assistance device is at least one of:
    (a) a computer integrated into the vehicle,
    (b) a vehicle navigation system integrated into the vehicle; and
    (c) a cellular phone.

18. A method of providing assistance during a process of driving a vehicle as recited in claim 16, wherein the step of displaying the information on a display of the driving assistance device is accomplished by displaying the information associated with a road sign on at least one of:
    (a) a display within a vehicle display,
    (b) a display of a vehicle navigation system, and
    (c) a display on a cellular phone.

19. A method of providing assistance during a process of driving a vehicle as recited in claim 16, wherein the step of obtaining information associated with a road sign in a proximity of the driving assistance device is accomplished by receiving a transmission from a wireless transmitting device located proximate the road sign.

20. A method of providing assistance during a process of driving a vehicle as recited in claim 16, the vehicle further comprising a wireless receiver integrated into the vehicle, wherein the step of obtaining information associated with a road sign in a proximity of the vehicle is accomplished by receiving a transmission from a wireless transmitting device located proximate the road sign using the wireless receiver integrated into the vehicle.

21. A method contributing to automated driving of a vehicle as recited in claim 16, wherein the information obtained from the road sign is a speed limit, the method further comprising a step of:
- adjusting a vehicle speed in accordance with the speed limit presented by the road sign.

22. A method of providing assistance during a process of driving a vehicle as recited in claim 16, the method further comprising steps of:
- associating a waypoint with a vacant parking space;
- conveying waypoints associated with vacant parking spaces to the driving assistance device;
- informing the user of locations of available parking spaces.

23. A method of providing assistance during a process of driving a vehicle as recited in claim 16, the method further comprising a step of:
- aiding a user in a process of returning to a parking location where the vehicle is parked.

\* \* \* \* \*